US012420551B2

(12) United States Patent
Takino

(10) Patent No.: US 12,420,551 B2
(45) Date of Patent: Sep. 23, 2025

(54) LIQUID EJECTING HEAD AND LIQUID EJECTING APPARATUS

(71) Applicant: SEIKO EPSON CORPORATION, Tokyo (JP)

(72) Inventor: Fumiya Takino, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 178 days.

(21) Appl. No.: 18/479,734

(22) Filed: Oct. 2, 2023

(65) Prior Publication Data

US 2024/0109321 A1 Apr. 4, 2024

(30) Foreign Application Priority Data

Oct. 3, 2022 (JP) ................................ 2022-159854

(51) Int. Cl.
*B41J 2/16* (2006.01)
*B41J 2/14* (2006.01)

(52) U.S. Cl.
CPC ......... *B41J 2/1623* (2013.01); *B41J 2/14024* (2013.01); *B41J 2/14072* (2013.01); *B41J 2/14233* (2013.01); *B41J 2/1433* (2013.01); *B41J 2/1601* (2013.01); *B41J 2/161* (2013.01); *B41J 2002/14491* (2013.01)

(58) Field of Classification Search
CPC .. B41J 2/1623; B41J 2/14024; B41J 2/14072; B41J 2/14233; B41J 2/1433; B41J 2/1601; B41J 2/161; B41J 2002/14491; B41J 2/16; B41J 2002/14362; B41J 2002/14419; B41J 2/14201; B41J 2/01; B41J 2/045; B41J 2/14
See application file for complete search history.

(56) References Cited

U.S. PATENT DOCUMENTS

| | | | | |
|---|---|---|---|---|
| 2012/0113189 A1* | 5/2012 | Kobayashi | ........... | B41J 2/14233 29/890.1 |
| 2014/0292908 A1 | 10/2014 | Watanabe | | |

FOREIGN PATENT DOCUMENTS

| | | |
|---|---|---|
| JP | 2014-188887 A | 10/2014 |

* cited by examiner

*Primary Examiner* — Lisa Solomon
(74) *Attorney, Agent, or Firm* — WORKMAN NYDEGGER

(57) ABSTRACT

A head chip that includes a nozzle plate having a plurality of nozzles configure to eject a liquid, another member different from the head chip, an adhesive that bonds the head chip and the other member, and a heating element configured to plasticize the adhesive are provided.

20 Claims, 21 Drawing Sheets

LIQUID EJECTING HEAD AND LIQUID EJECTING APPARATUS

The present application is based on, and claims priority from JP Application Serial Number 2022-159854, filed Oct. 3, 2022, the disclosure of which is hereby incorporated by reference herein in its entirety.

BACKGROUND

1. Technical Field

The present disclosure relates to a liquid ejecting head and a liquid ejecting apparatus that eject a liquid from a nozzle, and particularly to an ink jet type recording head and an ink jet type recording apparatus that eject ink as the liquid.

2. Related Art

In the related art, a liquid ejecting head that ejects a liquid from a nozzle by causing a pressure change in the liquid by a pressure generating unit such as a piezoelectric actuator or a heat generating element has been known.

As a liquid ejecting head, a liquid ejecting head has been proposed (for example, refer to JP-A-2014-188887) including a head chip in which a nozzle plate provided with a nozzle for ejecting a liquid and a flow path member provided with a flow path communicating with the nozzle are laminated, a fixing plate to which the head chip is fixed and in which an opening portion for exposing the nozzle is formed, and a filler that closes a space between the nozzle plate and an inner peripheral surface of the opening portion of the fixing plate.

However, since the components constituting the liquid ejecting head are bonded to each other with an adhesive, when a part of components of the liquid ejecting head, such as a fixing plate, a head chip, a filler, or the like fails, there is an issue that it is difficult to replace or repair a part of components and to regenerate the liquid ejecting head.

SUMMARY

According to an aspect of the present disclosure, there is provided a liquid ejecting head including a head chip that includes a nozzle plate having a plurality of nozzles ejecting a liquid, another member different from the head chip, an adhesive that bonds the head chip and the other member, and a heating element that plasticizes the adhesive.

In addition, according to another aspect of the present disclosure, there is provided a liquid ejecting head including a plurality of head chips that includes a nozzle plate having a plurality of nozzles ejecting a liquid, a fixing plate to which the plurality of head chips are fixed, and that includes a plurality of opening portions exposing the plurality of nozzle plates to an outside, a holder that holds the plurality of head chips, an adhesive that bonds the fixing plate and the holder, and a heating element that plasticizes the adhesive.

In addition, according to still another aspect of the present disclosure, there is provided a liquid ejecting apparatus including the liquid ejecting head according to the above aspect, in which the heating element is not energized.

DESCRIPTION OF EMBODIMENTS

Figure 1:
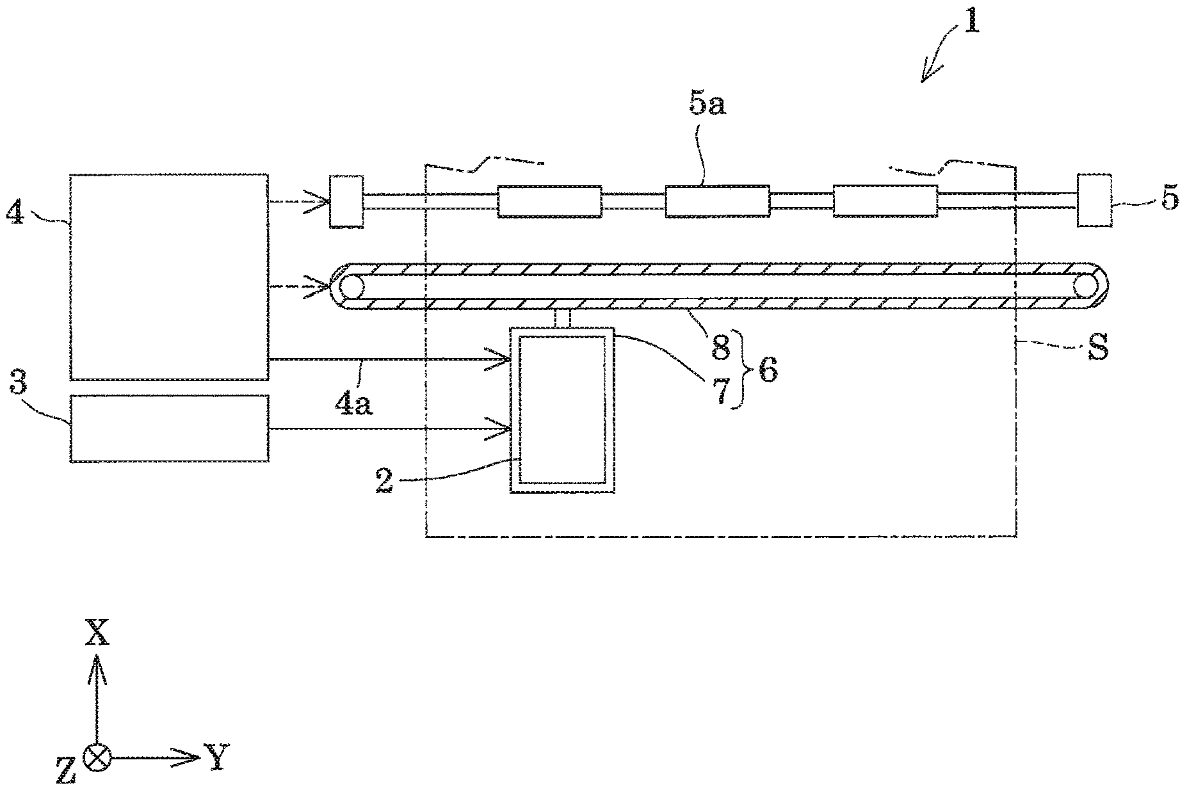
FIG. 1 is a schematic configuration diagram illustrating a liquid ejecting apparatus according to Embodiment 1.

Hereinafter, the present disclosure will be described in detail based on embodiments. However, the following description illustrates an aspect of the present disclosure, and can be randomly changed within the scope of the present disclosure. Those having the same reference numerals in each figure indicate the same members, and the description thereof is omitted as appropriate. In addition, in each figure, X, Y, and Z represent three spatial axes that are orthogonal to each other. In the present specification, the directions along these axes are the X direction, the Y direction, and the Z direction. The direction where the arrow in each figure is the positive (+) direction, and a direction opposite to the arrow is the negative (−) direction. In addition, the Z direction indicates a vertical direction, the +Z direction indicates a vertically downward direction, and the −Z direction indicates a vertically upward direction. Furthermore, the directions of three spatial axes that do not limit the positive direction and the negative direction will be described as the X-axis direction, the Y-axis direction, and the Z-axis direction.

Embodiment 1

FIG. 1 is a diagram illustrating a schematic configuration of a liquid ejecting apparatus 1 according to Embodiment 1 of the present disclosure. As illustrated in FIG. 1, the liquid ejecting apparatus 1 is an ink jet type recording apparatus that causes ink, which is a type of liquid, to be ejected and land on a printing medium S, and prints an image or the like based on an arrangement of dots formed on the medium S. As the medium S, any material such as a resin film or cloth can be used in addition to the recording paper.

The liquid ejecting apparatus 1 includes a liquid ejecting head 2, a liquid storage portion 3, a control portion 4, a transport mechanism 5 that feeds out a medium S, and a moving mechanism 6.

The liquid ejecting head 2 ejects the ink supplied from the liquid storage portion 3 onto the medium S from a plurality of nozzles 21. The detailed configuration of the liquid ejecting head 2 will be described later.

The liquid storage portion 3 individually stores a plurality of types, for example, a plurality of colors of ink ejected from the liquid ejecting head 2. Examples of the liquid storage portion 3 include a cartridge that can be attached to and detached from the liquid ejecting apparatus 1, a bag-shaped ink pack formed of a flexible film, an ink tank that can be refilled with ink, and the like.

Although not specifically illustrated, the control portion 4 is provided with, for example, a control device such as a central processing unit (CPU) or a field programmable gate array (FPGA), and a storage device such as a semiconductor memory. The control portion 4 collectively controls each element of the liquid ejecting apparatus 1, that is, the liquid ejecting head 2, the transport mechanism 5, the moving mechanism 6, and the like, by executing the program stored in the storage device by the control device.

The transport mechanism 5 transports the medium S in the X direction, and includes a transport roller 5*a*. That is, the transport mechanism 5 transports the medium S in the X direction by rotating the transport roller 5*a*. The transport mechanism 5 for transporting the medium S is not limited to one provided with the transport roller 5*a*, and may be one that transports the medium S by a belt or a drum, for example.

The moving mechanism 6 is a mechanism for reciprocating the liquid ejecting head 2 along the Y direction, and includes a transport body 7 and a transport belt 8. The transport body 7 is a substantially box-shaped structure for accommodating the liquid ejecting head 2, a so-called carriage, and is fixed to the transport belt 8. The transport belt 8 is the endless belt erected along the Y directions. The liquid ejecting head 2 reciprocates in the Y-axis direction together with the transport body 7 by rotating the transport belt 8 under the control of the control portion 4. The transport body 7 may be configured to mount the liquid storage portion 3 together with the liquid ejecting head 2.

Figure 3:
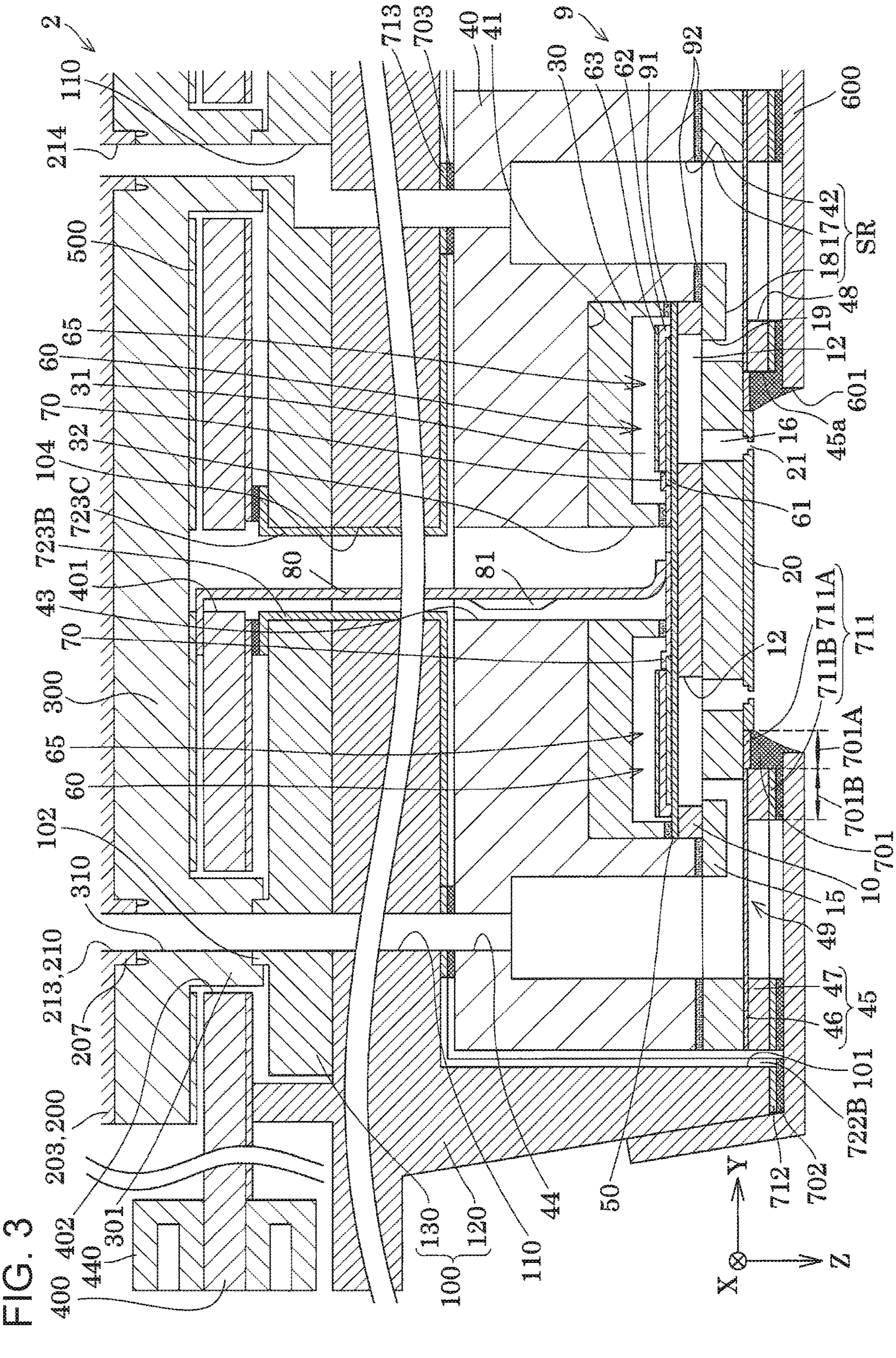
FIG. 3 is a cross-sectional view of a main part of the liquid ejecting head according to Embodiment 1.

Under the control of the control portion 4, the liquid ejecting head 2 performs an ejection operation of ejecting ink supplied from the liquid storage portion 3 as ink droplets from each of the plurality of nozzles 21 in the +Z direction (refer to FIG. 3). The ejection operation by the liquid ejecting head 2 is performed in parallel with the transporting of the medium S by the transport mechanism 5 and the reciprocating movement of the liquid ejecting head 2 by the moving mechanism 6, so that so-called printing is performed in which an image is formed on the surface of the medium S using ink.

Liquid Ejecting Head

Figure 2:
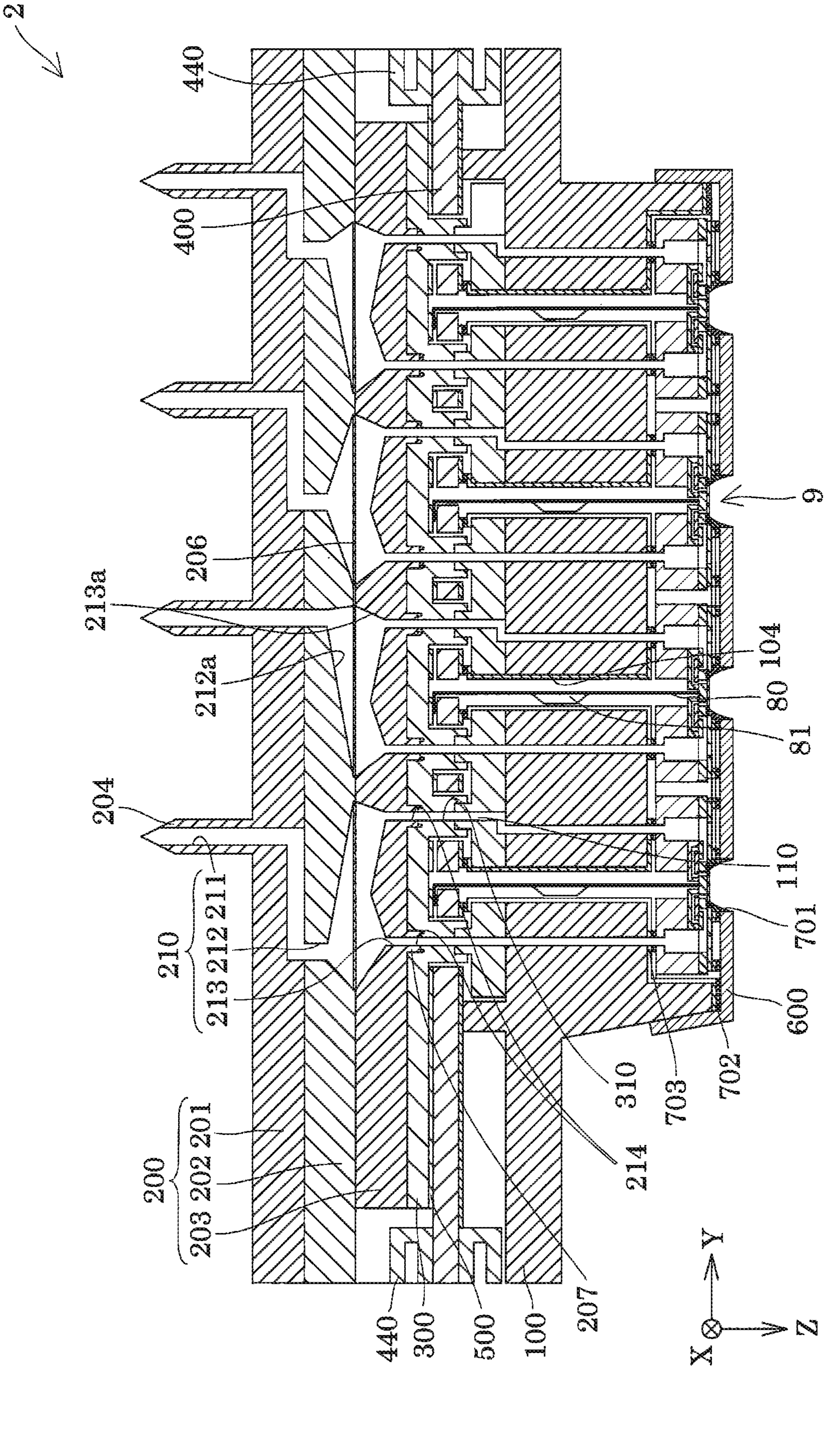
FIG. 2 is a cross-sectional view of a liquid ejecting head according to Embodiment 1.
Figure 4:
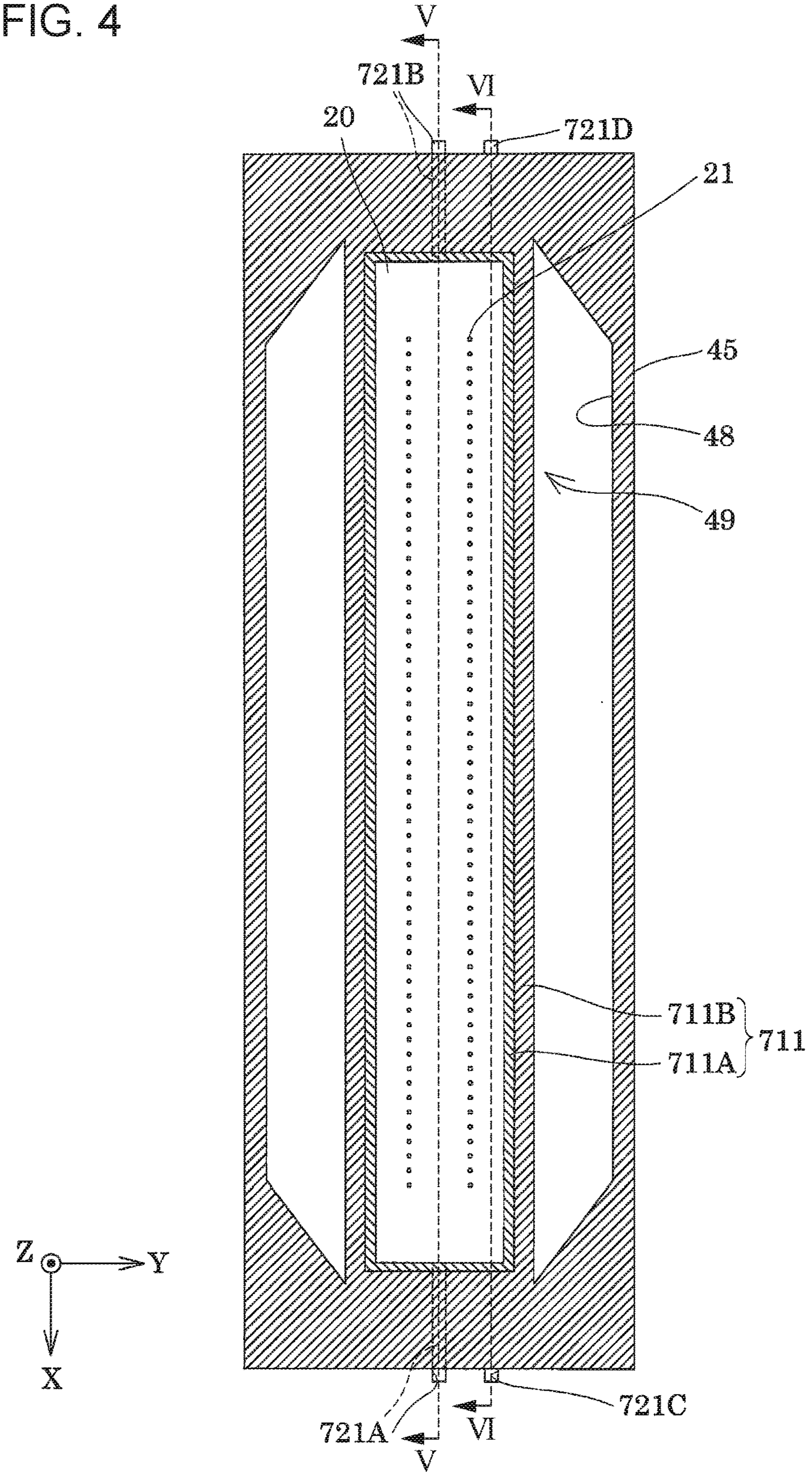
FIG. 4 is a plan view of a head chip according to Embodiment 1.
Figure 5:
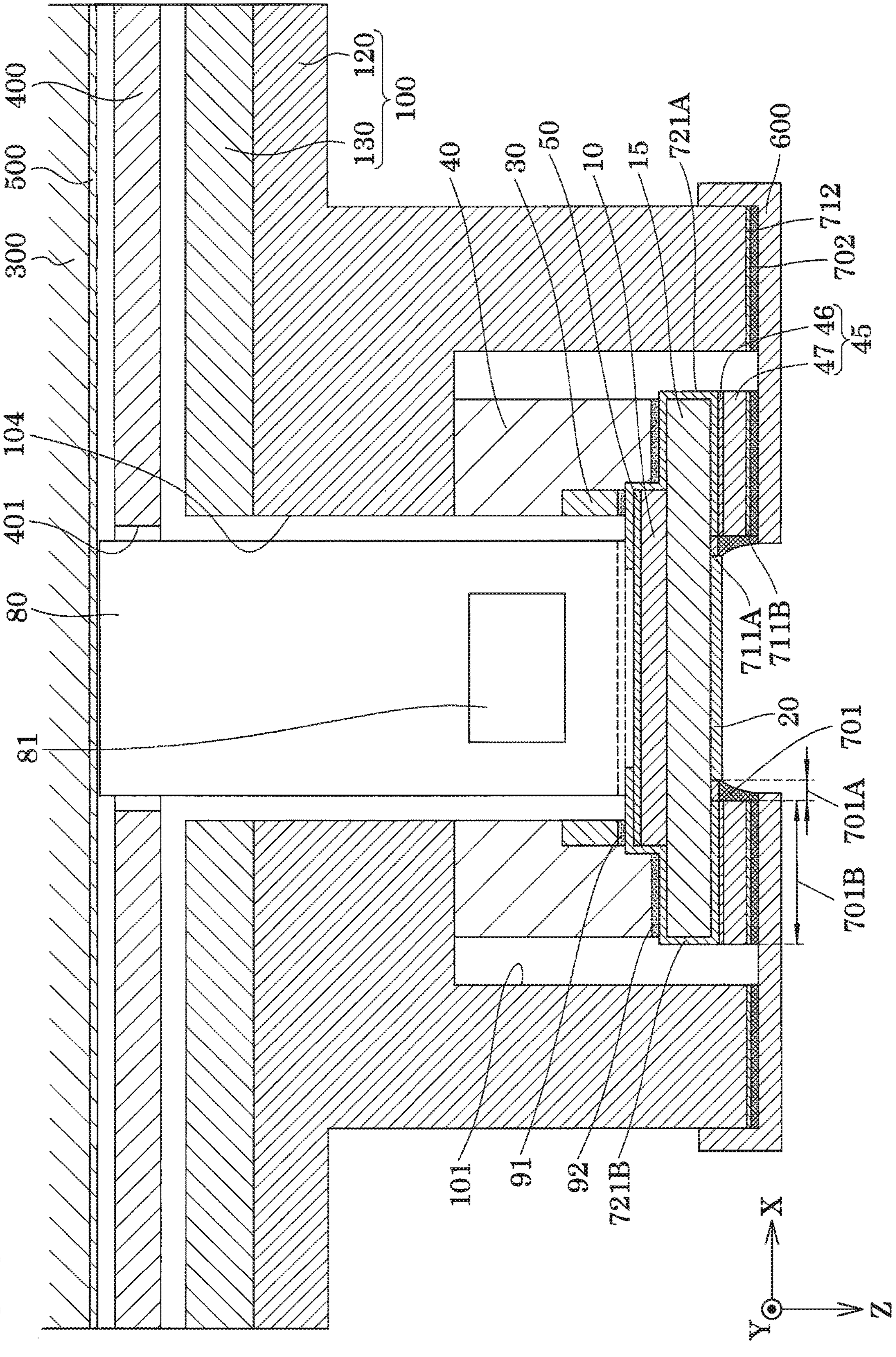
FIG. 5 is a cross-sectional view of a main part of the liquid ejecting head according to Embodiment 1.
Figure 6:
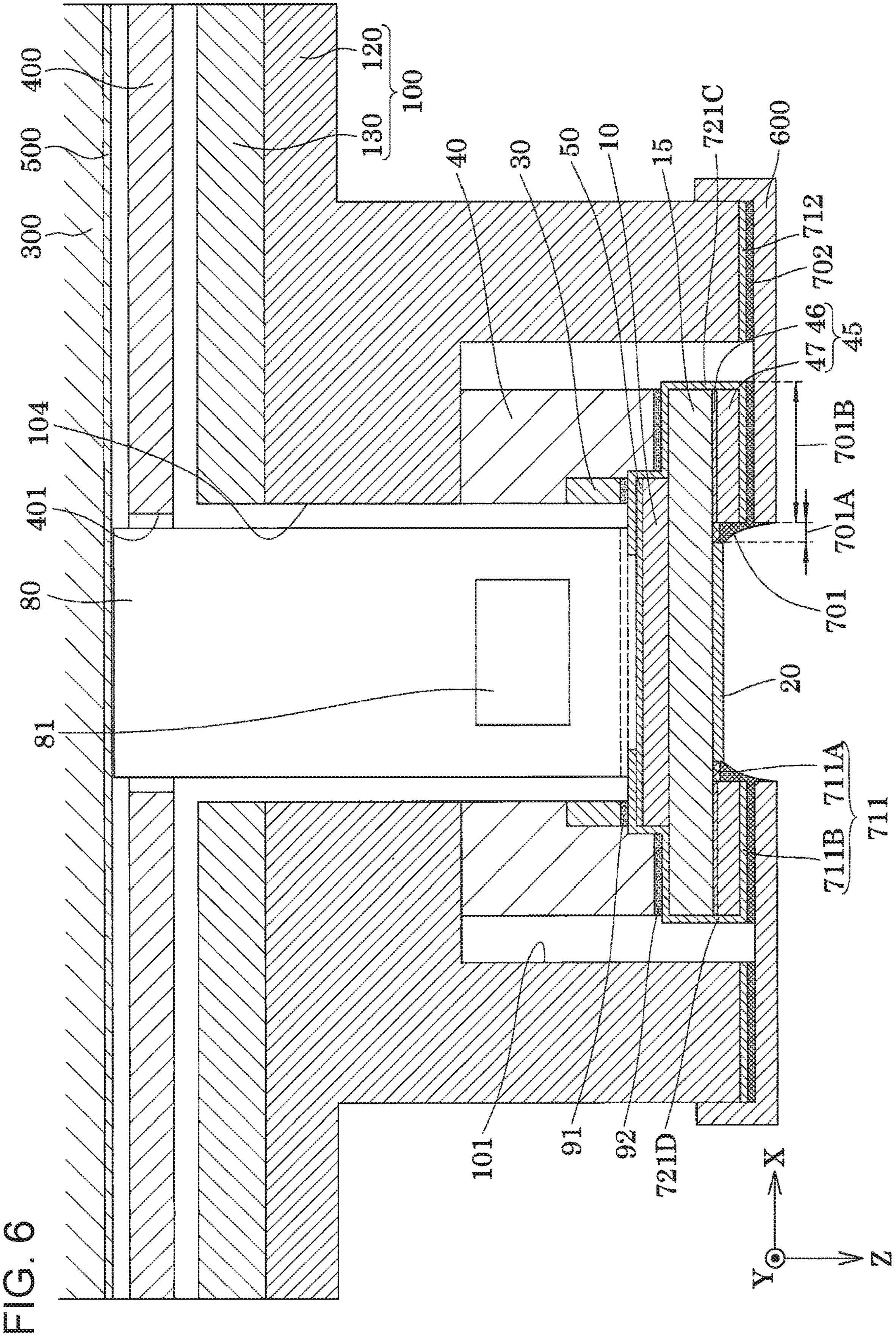
FIG. 6 is a cross-sectional view of a main part of the liquid ejecting head according to Embodiment 1.
Figure 7:
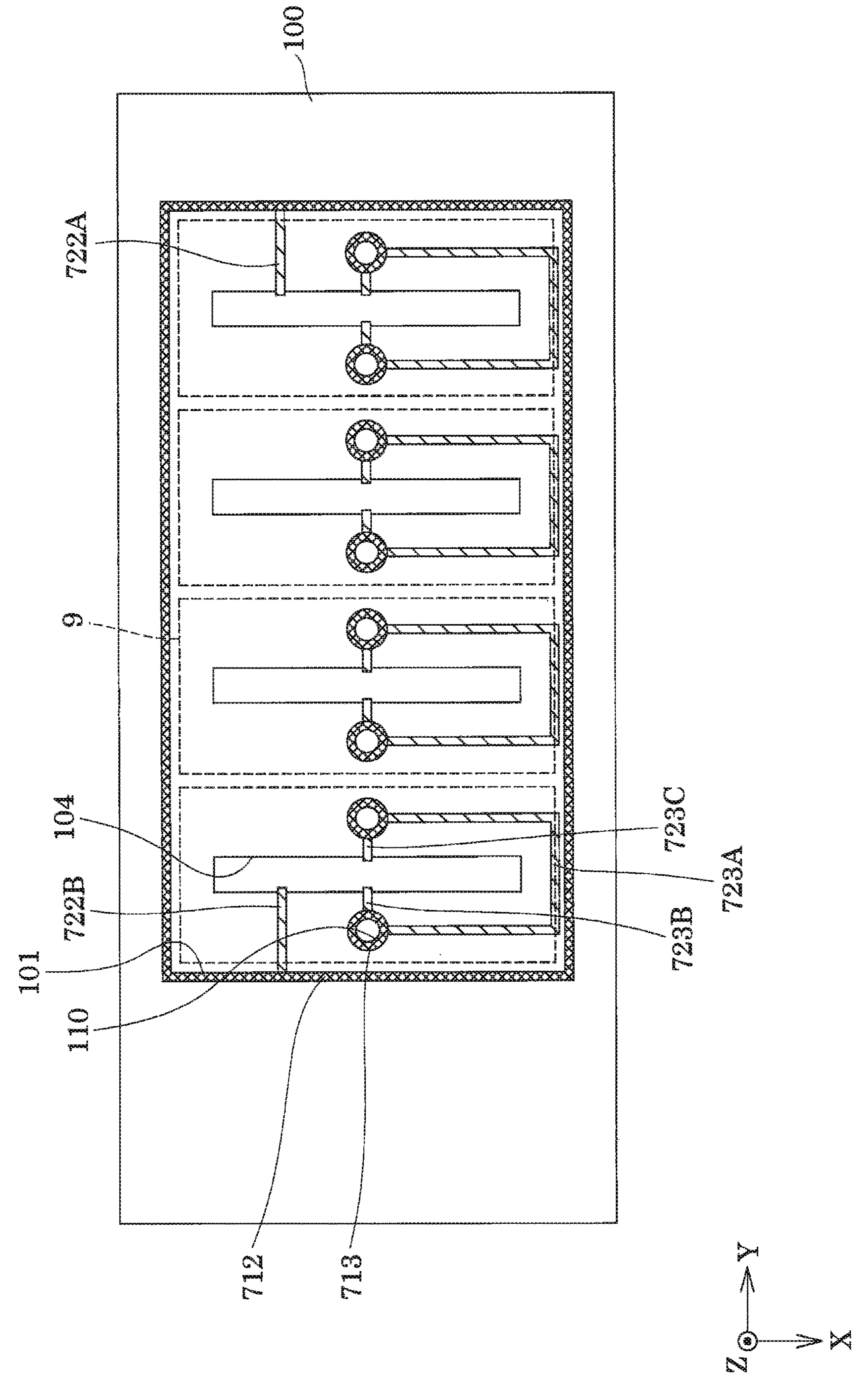
FIG. 7 is a plan view of a holder according to Embodiment 1.
Figure 8:
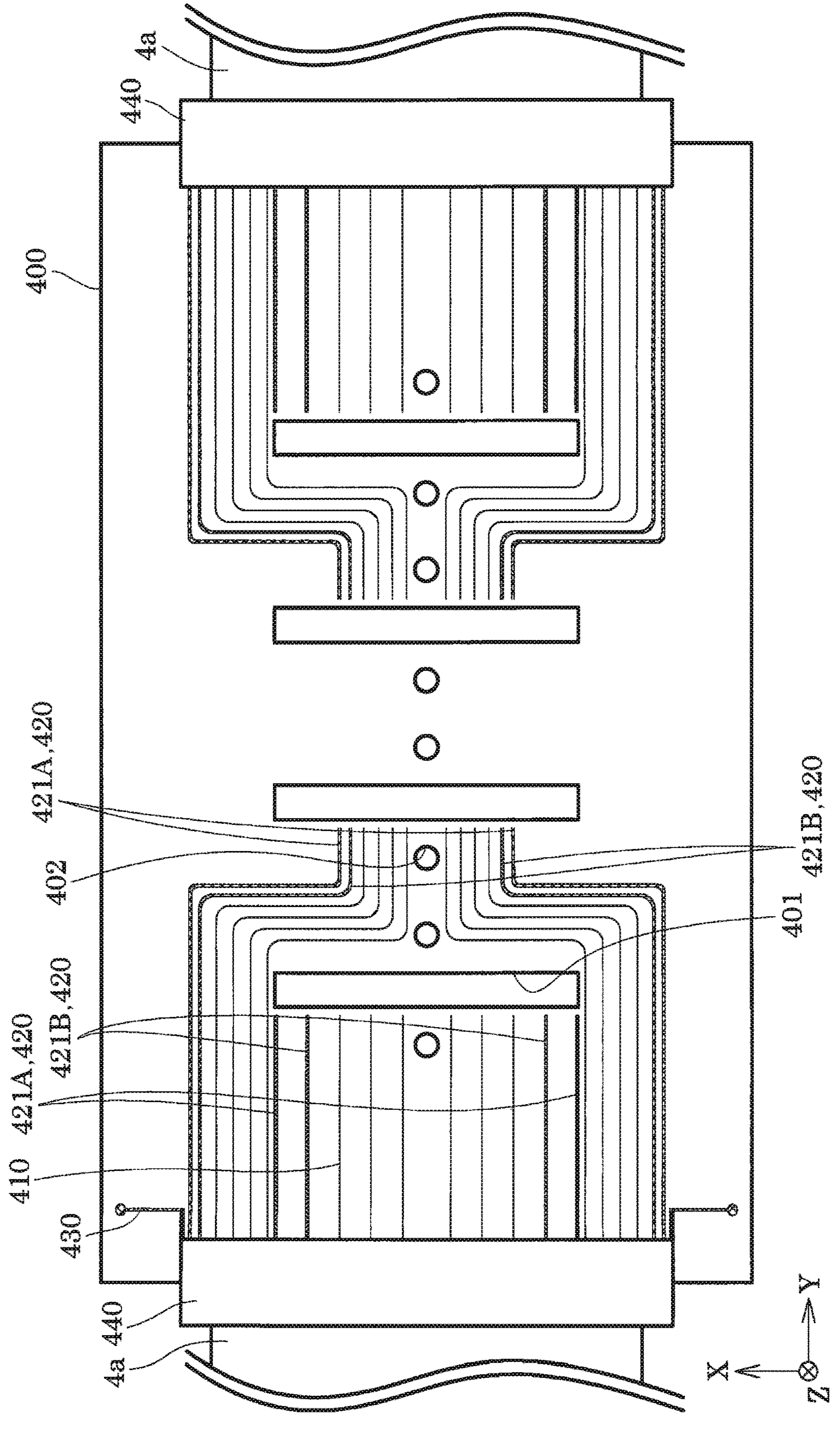
FIG. 8 is a plan view of a relay substrate according to Embodiment 1.
Figure 9:
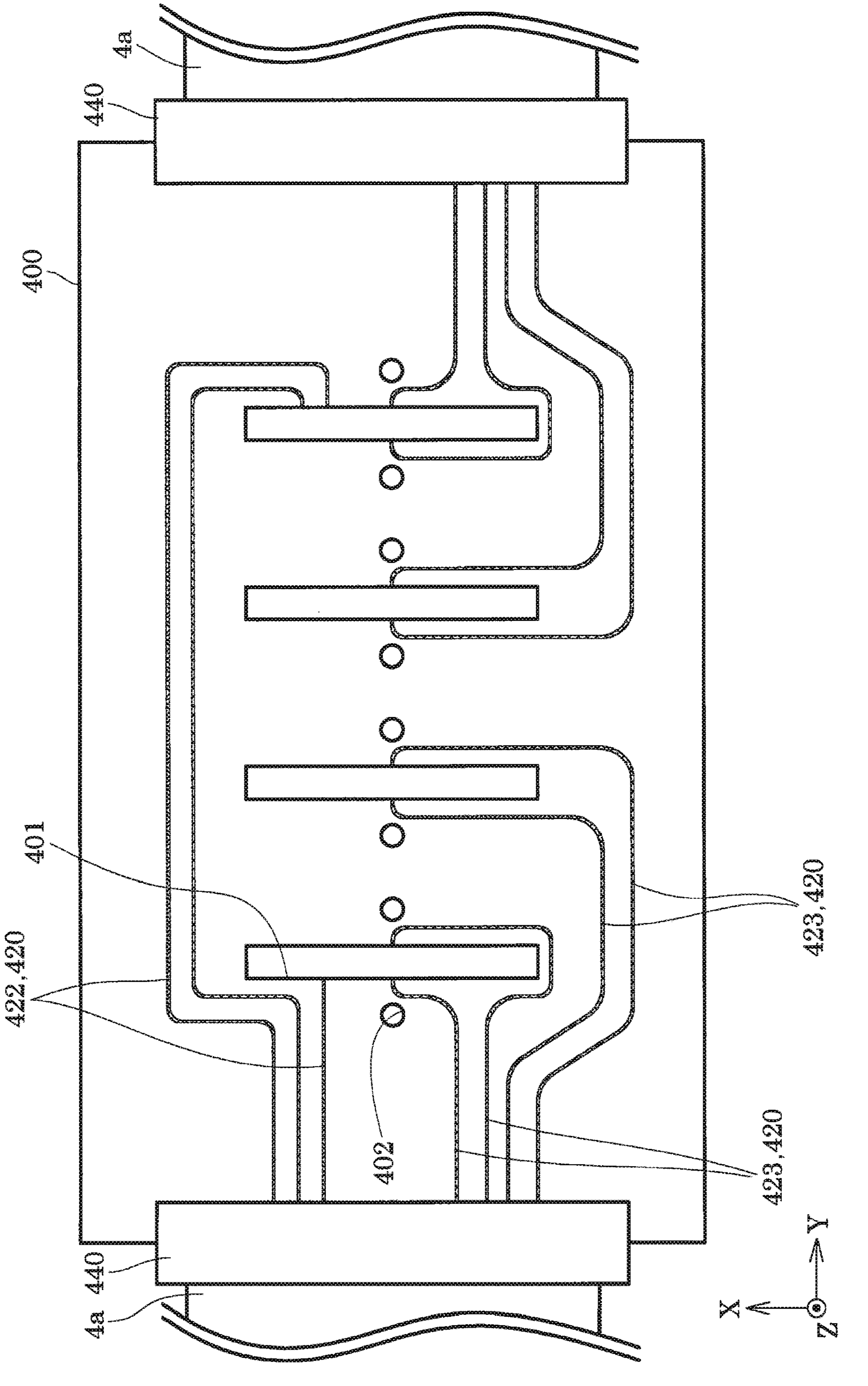
FIG. 9 is a plan view of the relay substrate according to Embodiment 1.

FIG. 2 is a cross-sectional view of the liquid ejecting head 2 according to Embodiment 1 of the present disclosure. FIG. 3 is a cross-sectional view enlarging a main part of the liquid ejecting head 2. FIG. 4 is a plan view of the head chip 9 as viewed in the −Z direction. FIG. 5 is a cross-sectional view of the liquid ejecting head 2 according to the line V-V of FIG. 4. FIG. 6 is a cross-sectional view of the liquid ejecting head 2 according to the line VI-VI of FIG. 4. FIG. 7 is a plan view of the holder 100 as viewed in the −Z direction. FIG. 8 is a plan view of the relay substrate 400 as viewed in the +Z direction. FIG. 9 is a plan view of the relay substrate 400 as viewed in the −Z direction.

As illustrated in FIGS. 2 and 3, the liquid ejecting head 2 includes four head chips 9 for ejecting ink as ink droplets from the nozzles 21, a holder 100 for holding the four head chips 9, and a flow path member 200 for supplying liquid to the head chips 9. In addition, the liquid ejecting head 2 includes a sealing member 300 that couples the holder 100 and the flow path member 200, a relay substrate 400 disposed between the holder 100 and the flow path member 200, a liquid heating portion 500 disposed between the relay substrate 400 and the sealing member 300, and a fixing plate 600 provided in the +Z direction of the head chip 9.

In the present embodiment, the flow path member 200 includes a first flow path member 201, a second flow path member 202, and a third flow path member 203. The first flow path member 201, the second flow path member 202, and the third flow path member 203 are laminated in this order in the +Z direction where the liquid is ejected. The flow path member 200 is not limited thereto, and may include a single member or a plurality of two or more members. In addition, the lamination direction of the plurality of members constituting the flow path member 200 is not particularly limited, and may be, for example, the X-axis direction or the Y-axis direction.

The flow path member 200 includes a flow path 210 through which a liquid flows between the liquid storage portion 3 and the head chip 9. The flow path 210 includes a first flow path member 201 provided in the first flow path 211, a second flow path 212 provided in the second flow path member 202, and a third flow path 213 provided in the third flow path member 203.

The first flow path member 201 includes a coupling portion 204 coupled to the liquid storage portion 3 on a surface facing the −Z direction. In the present embodiment, the coupling portion 204 protrudes in a needle shape in the −Z direction. The liquid storage portion 3 such as an ink cartridge may be directly coupled to the coupling portion 204 or the liquid storage portion 3 such as an ink pack and an ink tank may be coupled through a supply pipe or the like such as a tube. The first flow path member 201 includes the first flow path 211, one end open to an end portion of the coupling portion 204 in the −Z direction and the other end open to a surface of the first flow path member 201 facing the +Z direction. The ink from the liquid storage portion 3 is supplied to the first flow path 211. The first flow path 211 includes a flow path extending in the Z-axis direction, a flow path extending along the XY plane defined by the direction orthogonal to the Z-axis direction, that is, the X-axis direction and the Y-axis direction, or the like, depending on the position of the second flow path 212 described later. Hereinafter, the flow path extending in the Z-axis direction is referred to as a vertical flow path, and the flow path extending along the XY plane is referred to as a horizontal flow path. In addition, the horizontal flow path means that a component (also known as a vector) toward the horizontal plane exists in the extension direction. That is, the horizontal flow path includes not only a flow path along the XY plane but also a flow path inclined with respect to both the Z-axis direction and the direction along the XY plane. In addition, the extension direction of the flow path means a direction where the ink flows.

The second flow path member 202 is fixed to the surface of the first flow path member 201 facing the +Z direction. The second flow path member 202 includes the second flow path 212 communicating with the first flow path 211. The second flow path 212 is provided with one end open to a surface of the second flow path member 202 facing the −Z direction and the other end open to a surface of the second flow path member 202 facing the +Z direction. In addition, on the other end side of the second flow path 212, a widened first liquid reservoir 212*a* having an inner diameter wider than that of the first flow path 211 is provided.

The third flow path member 203 is fixed to the surface of the second flow path member 202 facing the +Z direction. In addition, the third flow path member 203 includes the third flow path 213 communicating with the second flow path 212. The third flow path 213 is provided with one end open to a surface of the third flow path member 203 facing the −Z direction and the other end open to a surface of the third flow path member 203 facing the +Z direction. In addition, one end side of the third flow path 213 is a second liquid reservoir 213*a* that is widened according to the first liquid reservoir 212*a*. Between the first flow path member 201 and the second flow path member 202, that is, between the first liquid reservoir 212*a* and the second liquid reservoir 213*a*, a filter 206 is provided for removing foreign matter such as dust and air bubbles contained in the ink. Therefore, the ink supplied from the second flow path 212 is supplied to the third flow path 213 in a state where foreign matter such as dust and air bubbles is removed through the filter 206.

In addition, the third flow path 213 is branched into two on the head chip 9 side of the second liquid reservoir 213*a*, that is, on the side opposite to the second flow path 212, and the third flow path 213 opens as two discharge ports 214 on the surface of the third flow path member 203 on the holder 100 side.

That is, the flow path 210 corresponding to one coupling portion 204 includes the first flow path 211, the second flow path 212, and the third flow path 213, and the flow path 210 opens as two discharge ports 214 on the holder 100 side.

In addition, a first protrusion portion 207 protruding toward the holder 100 is provided on the holder 100 side of the third flow path member 203, that is, on the surface facing the +Z direction. The first protrusion portion 207 is provided for each of the branched third flow paths 213, and the discharge port 214 opens at each tip end surface of the first protrusion portion 207 facing the +Z direction.

The first flow path member 201, the second flow path member 202, and the third flow path member 203 provided with such a flow path 210 are integrally bonded by, for example, an adhesive, welding, or the like. Although the first flow path member 201, the second flow path member 202, and the third flow path member 203 can be fixed with a screw, a clamp, or the like, it is possible to prevent ink from leaking from a coupling portion from the first flow path 211 to the third flow path 213 by bonding by an adhesive, welding, or the like.

As described above, in the present embodiment, one flow path member 200 includes four coupling portions 204, and one flow path member 200 includes four independent flow paths 210. Each of the flow paths 210 is branched into two on the holder 100 side, and a total of eight discharge ports 214 are provided. Incidentally, in the present embodiment, although a configuration in which the flow path 210 is branched into two on the head chip 9 side of the filter 206 is exemplified, the configuration is not particularly limited thereto, and the flow path 210 may be branched into three or more on the head chip 9 side of the filter 206. As a matter of course, one flow path 210 may be branched into two or more on the coupling portion 204 side of the filter 206. In addition, one flow path 210 may not be branched.

The holder 100 includes a recessed holding portion 101 that is open to a surface facing the +Z direction. A plurality of head chips 9 are bonded to the inside of such a holding portion 101 by a third adhesive 703 which is an adhesive. In the present embodiment, four head chips 9 are fixed to the inside of the holding portion 101 of the holder 100 by the third adhesive 703. Each of the four head chips 9 has the same structure.

The four head chips 9 held in the holder 100 are disposed side by side in the Y-axis direction at the same position in the X-axis direction. That is, the holding portion 101 is provided in common to the four head chips 9. As a matter of course, the holding portion 101 may be provided independently for each head chip 9. The disposition of the four head chips 9 is not particularly limited thereto, and may be disposed at different positions in both the X-axis direction and the Y-axis direction, for example. In addition, the plurality of head chips 9 may be disposed in a staggered pattern along the X-axis direction. Here, the fact that the plurality of head chips 9 are disposed in a staggered pattern means that the head chips 9 disposed in parallel in the X-axis direction are disposed to be alternately shifted in the Y-axis direction. That is, two rows of head chips 9 disposed in parallel in the X-axis direction are disposed in parallel in the Y-axis direction, and one row of the two rows of head chips 9 is disposed at a half-pitch shift in the X-axis direction. By disposing the plurality of head chips 9 in a staggered pattern along the X-axis direction in this manner, the nozzles of the two head chips 9 can be partially overlapped in the X-axis direction to form a row of nozzles that is continuous in the X-axis direction. In addition, the number of head chips 9 fixed to the holder 100 is not particularly limited thereto, and may be one head chip 9 for one holder 100 or a plurality of two or more head chips 9.

Although the details of the head chip 9 and the holder 100 will be described later, the surfaces facing each other in the Z-axis direction are bonded to each other by the third adhesive 703 which is an adhesive. That is, a surface of the head chip 9 facing the −Z direction and a bottom surface of the holding portion 101 of the holder 100 facing the +Z direction are bonded to each other by the third adhesive 703.

In addition, the holder 100 includes a coupling flow path 110 coupled to the flow path 210 of the flow path member 200. A second protrusion portion 102 that protrudes in the −Z direction is provided on a surface of the holder 100 facing the −Z direction. Each of the second protrusion portions 102 is provided for each flow path 210, that is, for each first protrusion portion 207, corresponding to the first protrusion portion 207. In addition, one end of the coupling flow path 110 is open to the tip end surface of the second protrusion portion 102, and the other end is open to the bottom surface of the holding portion 101 facing the +Z direction. Such a coupling flow path 110 is independently provided at the discharge port 214 of each flow path 210. That is, since one flow path 210 includes two discharge ports 214, the coupling flow path 110 communicating with each of the two discharge ports 214 is provided.

Of the two coupling flow paths 110 corresponding to one head chip 9, one coupling flow path 110 is formed linearly along the Z-axis direction in the present embodiment. In addition, the other coupling flow path 110 includes a horizontal flow path extending along the XY plane in the middle. In the present embodiment, the holder 100 includes a holder main body 120 and a flow path forming member 130 fixed to the surface of the holder main body 120 facing the −Z direction, and the horizontal flow path of the other coupling flow path 110 is formed at a lamination interface between the holder main body 120 and the flow path forming member 130. As a matter of course, the holder 100 may include a single member or may include a plurality of three or more members. In addition, although the other coupling flow path 110 has a horizontal flow path in the middle, the configuration is not particularly limited thereto, and the coupling flow path 110 may include only a vertical flow path, or may have two or more horizontal flow paths. In addition, one coupling flow path 110 may have a horizontal flow path.

In addition, a wiring member insertion hole 104 is provided between the two coupling flow paths 110 corresponding to one head chip 9 for inserting the wiring substrate 80. The wiring member insertion hole 104 communicates with a coupling port 43 of the head chip 9, which will be described in detail later, and is for inserting the wiring substrate 80 into the relay substrate 400 side of the holder 100.

In such a holder 100, a resin material can be formed at a low cost by molding. As a matter of course, the holder 100 may be made of a metal material or the like. In addition, when the holder main body 120 and the flow path forming member 130 are fixed to each other by an adhesive, the adhesive is preferably a thermosetting adhesive. As a result, it is possible to prevent the adhesive for fixing the holder main body 120 and the flow path forming member 130 from being plasticized by the heat transferred from a third heating element 713, which will be described in detail later.

The sealing member 300 is disposed between the flow path member 200 and the holder 100. The sealing member 300 functions as a joint that couples the flow path 210 of the flow path member 200 and the coupling flow path 110 of the holder 100.

For the sealing member 300, it is possible to use a material that has liquid resistance to the ink used for the liquid ejecting head 2 and is elastically deformable. The sealing member 300 includes a tubular portion 301 for each coupling flow path 110. The tubular portion 301 is provided with a communication flow path 310 inside. The flow path 210 of the flow path member 200 and the coupling flow path 110 of the holder 100 are communicated with each other through the communication flow path 310 of the tubular portion 301. The tubular portion 301 is held in a state where a predetermined pressure is applied in the Z-axis direction between the tip end surface of the first protrusion portion 207 of the flow path member 200 and the tip end surface of the second protrusion portion 102 of the holder 100. In this manner, the flow path 210 and the communication flow path 310 are coupled to each other in a state where pressure is applied to the sealing member 300 in the Z-axis direction, and the communication flow path 310 and the coupling flow path 110 are coupled to each other in a state where pressure is applied to the sealing member 300 in the Z-axis direction. Therefore, the flow path 210 and the coupling flow path 110 are communicated with each other through the communication flow path 310 in a liquid-tight state.

The tubular portion 301 of the present embodiment is coupled by a plate-shaped portion on the flow path member 200 side so that a plurality of tubular portions 301 are integrated with one flow path member 200. In addition, in the present embodiment, since eight discharge ports 214 of the flow path 210 are provided in one flow path member 200, the sealing member 300 is integrally provided with the eight tubular portions 301.

In addition, the relay substrate 400 is disposed between the sealing member 300 and the holder 100. The wiring substrate 80 is coupled to the relay substrate 400. The relay substrate 400 includes a first insertion hole 401 through which the wiring substrate 80 is inserted, and a second insertion hole 402 into which the tubular portion 301 of the sealing member 300 is inserted. One first insertion hole 401 is provided for each head chip 9, and two second insertion holes 402 are provided for each head chip 9. The first insertion hole 401 and the second insertion hole 402 are provided so as to penetrate the relay substrate 400 in the Z-axis direction.

In the present embodiment, the relay substrate 400 is made of a rigid substrate, and one is provided in common to the four head chips 9. As a matter of course, the relay substrate 400 may be provided to be divided for each head chip 9 or for each group including the plurality of head chips 9, or may be a so-called rigid flexible substrate in which the divided relay substrates 400 are coupled to each other by a flexible substrate.

In addition, as illustrated in FIG. 8, the relay substrate 400 includes a printed wiring 410 to which wiring (not illustrated) of the wiring substrate 80 of the head chip 9 is coupled on the surface facing the −Z direction, an on-substrate wiring 420 to which a heating element, which will be described later in detail, is coupled, and a relay wiring 430 for a liquid heating portion coupled to the liquid heating portion 500. The wiring substrate 80 is inserted into the first insertion hole 401 from the surface side of the relay substrate 400 facing the +Z direction, and is electrically coupled to the printed wiring 410 and the on-substrate wiring 420 on the surface of the relay substrate 400 facing the −Z direction.

In addition, as illustrated in FIG. 9, the relay substrate 400 includes the on-substrate wiring 420 coupled to a heating element, which will be described later in detail, on the surface facing the +Z direction. An electronic component (not illustrated) is mounted on either one or both of the surfaces of the relay substrate 400 facing the +Z direction and the surface facing the −Z direction.

In addition, the relay substrate 400 includes a connector 440. In the present embodiment, the connector 440 is provided on each of both end portions of the relay substrate 400 in the Y-axis direction and both sides in the Z-axis direction. The printed wiring 410, the on-substrate wiring 420, and the relay wiring 430 for the liquid heating portion are coupled to terminals (not illustrated) inside the connector 440. In the present embodiment, the printed wiring 410, a part of the on-substrate wiring 420, and the relay wiring 430 for the liquid heating portion are coupled to the terminals inside the same connector 440. As illustrated in FIGS. 8 and 9, an external wiring **4*a*, which is a part of the liquid ejecting apparatus 1 and is disposed outside the liquid ejecting head 2, is coupled to the connector 440. The control portion 4, the printed wiring 410, and the relay wiring 430 for the liquid heating portion are electrically coupled to each other by the external wiring 4*a*. The external wiring 4*a* and the on-substrate wiring 420 are not electrically coupled to each other. That is, in a normal use state where the liquid ejecting apparatus 1 can perform printing by coupling the external wiring 4***a* and the connector 440, power is not supplied to the on-substrate wiring 420 via the connector 440. The external wiring 4*a* is, for example, a flexible substrate such as a flexible flat cable. As a matter of course, the printed wiring 410 and the relay wiring 430 for the liquid heating portion used for the recording operation, and the on-substrate wiring 420 for the heating element, which will be described in detail later, may be coupled to terminals of different connectors. In addition, when different connectors are used, by changing the shape and size of the connector, it is possible to prevent the external wiring 4*a* from being erroneously coupled to a connector having a terminal to be coupled to the on-substrate wiring 420 for the heating element.

The liquid heating portion 500 is disposed between the relay substrate 400 and the sealing member 300. The liquid heating portion 500 is for heating the ink flowing inside the liquid ejecting head 2. For example, a planar heater in which a heat generation resistor is interposed between sheets of resin or the like is used.

Such a liquid heating portion 500 is coupled to the outside via the relay substrate 400. As illustrated in FIG. 8, the relay substrate 400 includes a relay wiring 430 for the liquid heating portion, one end of which is coupled to the connector 440, on a surface facing the −Z direction. The liquid heating portion 500 is electrically coupled to the other end of the relay wiring 430 for the liquid heating portion of the relay substrate 400 via a flexible substrate (not illustrated), and power is supplied from the external wiring 4*a* via the connector 440 and the relay wiring 430 for the liquid heating portion. As a result, the liquid heating portion 500 generates heat, and the ink inside the flow path member 200 is heated from the liquid heating portion 500 via the sealing member 300. In order to efficiently transfer the heat from the liquid heating portion 500 to the flow path member 200, the sealing member 300 is preferably made of a material having thermal conductivity.

Here, the liquid typified by the ink ejected from the liquid ejecting head 2 has a viscosity suitable for ejection depending on the type of the liquid. Since the viscosity of the liquid correlates with the temperature, the viscosity is increased as the temperature is decreased, and the viscosity is decreased as the temperature is increased. Therefore, when the liquid ejecting head 2 designed to be suitable for the viscosity of a liquid to be normally used is placed in a low temperature environment or when ejecting a liquid having a high viscosity, the liquid heating portion 500 heats the liquid flowing inside the liquid ejecting head 2. As a result, it is possible to reduce the viscosity of the liquid ejected from the liquid ejecting head 2 and improve the ejection characteristics of the liquid ejected from the liquid ejecting head 2. Therefore, the relay wiring 430 for the liquid heating portion provided on the relay substrate 400 is included in the "printing path" which is an electrical path contributing to the recording operation of ejecting the liquid on the medium S.

In the present embodiment, although the liquid heating portion 500 is provided between the relay substrate 400 and the sealing member 300, the configuration is not particularly limited thereto, and the liquid heating portion 500 may be provided between the flow path member 200 and the sealing member 300, or may be provided between the holder 100 and the sealing member 300. In addition, the liquid heating portion 500 may be provided on an outer peripheral surface such as a surface or a side surface of the flow path member 200 facing the −Z direction, or may be provided outside the liquid ejecting head 2, that is, not in contact with the liquid ejecting head 2. In addition, the liquid ejecting apparatus 1 may not include the liquid heating portion 500.

Although details will be described later, the fixing plate 600 is bonded to a surface of the holder 100 facing the +Z direction where the holding portion 101 is open and a surface of the plurality of head chips 9 facing the +Z direction. The fixing plate 600 and the head chip 9 are bonded to each other by a first adhesive 701 which is an adhesive. In addition, the fixing plate 600 and the holder 100 are bonded to each other by a second adhesive 702 which is an adhesive. That is, in the present embodiment, the fixing plate 600 has a size that covers the plurality of head chips 9 and also covers the opening of the holding portion 101 in the +Z direction. The fixing plate 600 may be configured by laminating a plurality of plate-shaped members in the Z-axis direction.

An example of the head chip 9 of the present embodiment will be described. Each direction of the head chip 9 will be described based on the directions when mounted on the liquid ejecting head 2, that is, the X direction, the Y direction, and the Z direction.

As illustrated in FIGS. 3 and 4, in the head chip 9, a plurality of laminated members such as the pressure chamber substrate 10, the protective substrate 30, the flow path forming substrate 15, the nozzle plate 20, the case member 40, the compliance substrate 45, the diaphragm 50, and the like are laminated in the Z-axis direction. At least one of these plurality of laminated members is bonded by an adhesive. In the present embodiment, all the laminated members are bonded to each other by an adhesive. In FIG. 3, only the first laminating adhesive 91, which is an adhesive that bonds the diaphragm 50 and the protective substrate 30, and the second laminating adhesive 92, which is an adhesive that bonds the case member 40 and the flow path forming substrate 15, are illustrated. As a matter of course, the laminated members are not limited to bonding by an adhesive, and may be bonded by thermal welding, direct bonding, or the like. In addition, as the adhesive for laminating the laminated members, for example, a thermosetting adhesive that cures by heating, a solvent volatilization adhesive that cures by evaporating an organic solvent, a moisture-curing adhesive that is bonded by reacting with moisture in the air, and a reactive adhesive that cures by a chemical reaction when a main agent is mixed with a curing agent. When a member having ultraviolet light transmittance is used as the laminated member, an ultraviolet curable adhesive can also be used as the adhesive that bonds the laminated members. In addition, a thermoplastic adhesive can be used as the adhesive that bonds the laminated members, and as the thermoplastic adhesive that bonds the laminated members, it is necessary to use one that is plasticized at a temperature higher than the temperature at which the first adhesive 701, the second adhesive 702, and the third adhesive 703 are plasticized. However, by bonding at least a part of the laminated members of the plurality of laminated members constituting the head chip 9 by the thermosetting adhesive, even when the heat from the heating element, which will be described later, is transferred to the thermosetting adhesive, since the thermosetting adhesive is not plasticized, it is possible to suppress leakage of ink from the laminated members, disassembly or positional displacement of the laminated members, and the like. In addition, since the thermosetting adhesive has relatively high ink resistance, deterioration of the thermosetting adhesive due to ink can be suppressed.

The pressure chamber substrate 10 includes a silicon substrate, a glass substrate, an SOI substrate, and various ceramic substrates. On the pressure chamber substrate 10, a plurality of pressure chambers 12 are disposed side by side along the X-axis direction. The plurality of pressure chambers 12 are disposed on a straight line along the +X direction so that the positions in the +Y direction are the same. In addition, on the pressure chamber substrate 10, a plurality of rows in which the pressure chambers 12 are disposed in parallel in the +X direction are disposed in parallel, and two rows in the present embodiment are disposed in parallel in the +Y direction.

The flow path forming substrate 15 and the nozzle plate 20 are sequentially laminated on the surface of the pressure chamber substrate 10 facing the +Z direction.

The flow path forming substrate 15 is provided with a nozzle communication path 16 that communicates with the pressure chamber 12 and the nozzle 21. In addition, the flow path forming substrate 15 is provided with a first manifold portion 17 and a second manifold portion 18 constituting a part of a manifold SR which is a common liquid chamber with which the plurality of pressure chambers 12 communicate in common. The first manifold portion 17 is provided to penetrate the flow path forming substrate 15 in the Z-axis direction. In addition, the second manifold portion 18 is provided to be open to the surface facing the +Z direction without penetrating the flow path forming substrate 15 in the Z-axis direction.

Furthermore, the flow path forming substrate 15 is provided with a supply communication path 19 communicating with the end portion of the pressure chamber 12 in the Y-axis direction independently in each of the pressure chambers 12. The supply communication path 19 communicates with the second manifold portion 18 and the pressure chamber 12 to supply the ink in the manifold SR to the pressure chamber 12.

As such a flow path forming substrate 15, a silicon substrate, a glass substrate, an SOI substrate, various ceramic substrates, a metal substrate such as a stainless steel substrate, or the like can be used. The flow path forming substrate 15 preferably uses a material having substantially the same coefficient of thermal expansion as that of pressure chamber substrate 10. In this manner, by using the materials having approximately the identical coefficient of thermal expansion for the pressure chamber substrate 10 and the flow path forming substrate 15 as described above, it is possible to reduce the occurrence of a warpage due to heat by a difference in the coefficient of thermal expansion.

The nozzle plate 20 is provided on the side of the flow path forming substrate 15 opposite to the pressure chamber substrate 10, that is, on the surface facing the +Z direction.

The nozzle plate 20 is formed with the nozzle 21 that communicates with each of the pressure chambers 12 via the nozzle communication path 16. In the present embodiment, the plurality of nozzles 21 are provided with two rows of nozzles disposed side by side in a row along the +X direction and separated from each other in the +Y direction. That is, the plurality of nozzles 21 in each row are disposed so that the positions in the +Y direction are the same as each other. As a matter of course, the disposition of the nozzles 21 is not particularly limited thereto, and for example, may be a so-called staggered disposition in which every other nozzle 21 is disposed at positions shifted in the +Y direction, in the nozzles 21 disposed side by side in the +X direction. As such a nozzle plate 20, a silicon substrate, a glass substrate, an SOI substrate, various ceramic substrates, a metal substrate such as a stainless steel substrate, an organic substance such as a polyimide resin, or the like can be used. It is preferable to use a material for the nozzle plate 20 that is substantially the same as the coefficient of thermal expansion of the flow path forming substrate 15. By using materials having substantially the same coefficient of thermal expansion between the nozzle plate 20 and the flow path forming substrate 15 in this manner, it is possible to reduce the occurrence of warpage due to heat due to the difference in the coefficient of thermal expansion.

The diaphragm 50 and the piezoelectric actuator 60 are sequentially laminated on the surface of the pressure chamber substrate 10 facing the −Z direction. That is, the pressure chamber substrate 10, the diaphragm 50, and the piezoelectric actuator 60 are laminated in this order in the −Z direction. The pressure chamber substrate 10 and the diaphragm 50 may be integrally formed. Specifically, by etching the surface of the pressure chamber substrate 10 formed of a silicon substrate on the +Z direction side, a recessed portion recessed in the −Z direction may be formed as the pressure chamber 12 on the surface of the pressure chamber substrate 10 on the +Z direction side, and a bottom surface portion of the recessed portion may function as the diaphragm 50.

The piezoelectric actuator 60 includes a first electrode 61, a piezoelectric layer 62, and a second electrode 63 that are sequentially laminated from the side of the +Z direction, which is the side of the diaphragm 50, to the side of the −Z direction. The piezoelectric actuator 60 is a pressure generating unit that causes a pressure change in the ink in the pressure chamber 12. Such a piezoelectric actuator 60 is also referred to as a piezoelectric element, and refers to a portion including the first electrode 61, the piezoelectric layer 62, and the second electrode 63. In addition, a portion where piezoelectric strain occurs in the piezoelectric layer 62 when a voltage is applied between the first electrode 61 and the second electrode 63 is referred to as an active portion 65. On the other hand, a portion where piezoelectric strain does not occur in the piezoelectric layer 62 is referred to as an inactive portion. In the present embodiment, the active portion is formed for each pressure chamber 12. In general, any one of the electrodes of the active portion 65 is configured as an independent individual electrode for each active portion 65, and the other electrode is configured as a common electrode common to the plurality of active portions 65. In the present embodiment, the first electrode 61 constitutes an individual electrode, and the second electrode 63 constitutes a common electrode. As a matter of course, the first electrode 61 may form a common electrode, and the second electrode 63 may form an individual electrode. A lead electrode 70, which is a lead-out wiring, is drawn out from each electrode of such a piezoelectric actuator 60. The flexible wiring substrate 80 is coupled to an end portion of the lead electrode 70 opposite to the end portion coupled to the piezoelectric actuator 60. The wiring substrate 80 includes a COF (Chip on Film) on which a drive circuit 81 having a switching element for driving the piezoelectric actuator 60 is mounted.

The protective substrate 30 having substantially the same size as that of the diaphragm 50 is bonded to a surface of the diaphragm 50 facing the −Z direction. In the present embodiment, the diaphragm 50 and the protective substrate 30 are bonded to each other by the first laminating adhesive 91. The first laminating adhesive 91 of the present embodiment is made of a thermosetting adhesive. The protective substrate 30 includes a holding portion 31 which is a space for protecting the piezoelectric actuator 60. The holding portions 31 are independently provided for each row of the piezoelectric actuators 60 disposed side by side in the +X direction, and two holding portions 31 are provided in parallel in the +Y direction. In addition, the protective substrate 30 is provided with a through-hole 32 penetrating in the +Z direction between two holding portions 31 disposed side by side in the +Y direction. The end portion of the lead electrode 70 drawn out from the electrode of the piezoelectric actuator 60 is extended so as to be exposed in the through-hole 32, and the lead electrode 70 and the wiring (not illustrated) of the wiring substrate 80 are electrically coupled to each other in the through-hole 32. As described above, the other end portion of the wiring substrate 80 is electrically coupled to the printed wiring 410 and the on-substrate wiring 420 of the relay substrate 400. The wiring of the wiring substrate 80 coupled to each electrode of the piezoelectric actuator 60 via the lead electrode 70 is coupled to the drive circuit 81 in the middle. In addition, a print signal or the like is input to the drive circuit 81 via the printed wiring 410 of the relay substrate 400. That is, the printed wiring 410, the lead electrode 70, the piezoelectric actuator 60, the drive circuit 81, the wiring (not illustrated) on the wiring substrate 80 for electrically coupling the lead electrode 70 and the printed wiring 410, the relay wiring 430 for the liquid heating portion, and the liquid heating portion 500 are included in a "printing path" which is an electrical path contributing to the recording operation of ejecting ink on the medium S. Although not particularly illustrated, for example, when a sensor for detecting the temperature inside the liquid ejecting head 2 and the wiring coupled to the sensor are provided, these are also included in the "printing path".

The case member 40 has substantially the same shape as that of the flow path forming substrate 15 described above in a plan view when viewed in the +Z direction, and is also bonded to the flow path forming substrate 15 described above. In the present embodiment, the case member 40 is bonded to the flow path forming substrate 15 by the second laminating adhesive 92. The second laminating adhesive 92 of the present embodiment is made of a thermosetting adhesive.

Such a case member 40 includes a recessed portion 41 having a depth that is open to a surface facing the +Z direction and accommodates the pressure chamber substrate 10 and the protective substrate 30. A surface of the recessed portion 41 facing the +Z direction is sealed with the flow path forming substrate 15, in a state where the pressure chamber substrate 10 and the like are accommodated in the recessed portions 41. The case member 40 is provided with a third manifold portion 42 on each of the +Y direction side and the −Y direction side of the recessed portion 41. The third manifold portion 42 is provided to be open to a surface facing the +Z direction. The manifold SR includes the first manifold portion 17 and the second manifold portion 18 provided in the flow path forming substrate 15, and the third manifold portion 42 provided in the case member 40. A total of two manifolds SR are provided, one for each row of the pressure chambers 12. Each of the manifolds SR is continuously provided in the +X direction where the pressure chambers 12 are disposed side by side, and the supply communication paths 19 that communicate each of the pressure chambers 12 and the manifold SR are disposed side by side in the +X direction.

In addition, the case member 40 is provided with an inlet 44 for communicating ink with the manifold SR and supplying ink to each manifold SR. In the present embodiment, the inlet 44 is provided for each manifold SR. That is, one head chip 9 is provided with two inlets 44.

In addition, the case member 40 is provided with the coupling port 43 that communicates with the through-hole 32 of the protective substrate 30 and through which a wiring substrate 80 is inserted. The coupling port 43 is provided so as to penetrate between the two third manifold portions 42 in the Y-axis direction over the Z-axis direction.

In addition, a compliance substrate 45 is provided on the surface of the flow path forming substrate 15 on the surface facing the +Z direction where the first manifold portion 17 and the second manifold portion 18 open. The compliance substrate 45 seals the openings of the first manifold portion 17 and the second manifold portion 18 on the +Z direction side. In the present embodiment, such a compliance substrate 45 includes a sealing film 46 made of a flexible thin film and a fixed substrate 47 made of a hard material such as metal such as stainless steel (SUS). Since a region of the fixed substrate 47 facing the manifold SR is an opening portion 48 completely removed in the thickness direction, one surface of the manifold SR is a compliance portion 49 which is a flexible portion sealed only by the flexible sealing film 46.

In addition, the compliance substrate 45 includes an opening portion **45*a* that exposes the nozzle plate 20 to the outside. The opening portion 45*a* has a slightly larger opening area than that of the nozzle plate 20 when viewed in the −Z direction. Therefore, a surface of the flow path forming substrate 15 facing the +Z direction is exposed between an opening edge portion of a first exposed opening portion and a peripheral edge portion of the nozzle plate 20**.

The fixing plate 600 is bonded to the surface of the compliance substrate 45 of the head chip 9 facing the +Z direction by a first adhesive 701 which is an adhesive. The first adhesive 701 that bonds the fixing plate 600 and the compliance substrate 45 is made of a thermoplastic adhesive. The thermoplastic adhesive has the property of softening or melting the resin when heated to a predetermined temperature and solidifying when the temperature drops. In addition, the first adhesive 701 preferably has an insulating property. As a result, it is possible to suppress the current flowing through a first heating element 711 from being transferred to the nozzle plate 20 and the fixing plate 600. Although not particularly illustrated, since the space between the fixing plate 600 and the compliance portion 49 is open to the atmosphere, the compliance portion 49 can be displaced in the +Z direction and the −Z direction according to pressure fluctuations within the manifold SR.

In addition, although not particularly illustrated, a liquid repellent film having liquid repellent properties against ink is formed on the surface of the fixing plate 600 facing the +Z direction. Similarly, a liquid repellent film is formed on the surface of the nozzle plate 20 facing the +Z direction.

The fixing plate 600 includes an opening portion 601 that communicates with the opening portion **45*a* of the compliance substrate 45 and exposes the nozzle plate 20 to the outside. In the present embodiment, the opening portion 601 has a size that exposes the entire nozzle plate 20, that is, has substantially the same size as that of the opening portion 45*a* of the compliance substrate 45. In addition, the opening portion 601 is provided independently for each nozzle plate 20. Since four head chips 9 are bonded to one fixing plate 600, four opening portions 601** are provided.

In addition, the first adhesive 701 that bonds the fixing plate 600 and the compliance substrate 45 includes a closing portion 701A that is provided between the nozzle plate 20 and the inner peripheral surface of the opening portion 601 of the fixing plate 600 and that closes the space between the fixing plate 600 and the nozzle plate 20. In the present embodiment, since the opening portion 601 has a larger opening than that of the nozzle plate 20, the closing portion 701A is provided between the inner peripheral surface of the opening portion 601 and the side surface of the nozzle plate 20, so that the surface of the flow path forming substrate 15 is not exposed.

In addition, the first adhesive 701 includes a main fixing portion 701B disposed farther from the opening portion 601 than the closing portion 701A. The main fixing portion 701B bonds both of the fixing plate 600 and the compliance substrate 45 therebetween. That is, the main fixing portion 701B is a portion where the compliance substrate 45 of the first adhesive 701 and the fixing plate 600 overlap when viewed in the Z-axis direction, and the closing portion 701A is a portion that overlaps between the inner peripheral surface of the opening portion 601 of the first adhesive 701 and the nozzle plate 20 when viewed in the Z-axis direction. In addition, the closing portion 701A also includes a portion between the inner peripheral surface of the opening portion 45*a* of the compliance substrate 45 and the side surface of the nozzle plate 20 on the surface of the fixing plate 600 facing the −Z direction. In the present embodiment, the closing portion 701A and the main fixing portion 701B of the first adhesive 701 are integrally provided, and as a matter of course, the closing portion 701A and the main fixing portion 701B may be disposed at separate positions so as to be divided.

In addition, the first heating element 711 which is a heating element for heating and plasticizing the first adhesive 701 is provided at a portion of the liquid ejecting head 2 where the first adhesive 701 is provided. In the present embodiment, the first heating element 711 includes a first portion 711A for heating and plasticizing the closing portion 701A and a second portion 711B for heating and plasticizing the main fixing portion 701B.

The first portion 711A is a surface of the flow path forming substrate 15 facing the +Z direction, and is provided on an exposed surface between the nozzle plate 20 and the opening portion 45*a* of the compliance substrate 45. That is, the first portion 711A is disposed in direct contact with the closing portion 701A at a position overlapping the closing portion 701A of the first adhesive 701 in the Z-axis direction. In addition, the first heating element 711 and the first adhesive 701 are disposed so as to overlap each other when viewed in the Z-axis direction.

The second portion 711B is formed on the surface of the fixed substrate 47 of the compliance substrate 45 facing the +Z direction. That is, the second portion 711B is disposed in direct contact with the main fixing portion 701B at a position overlapping the main fixing portion 701B of the first adhesive 701 in the Z-axis direction. That is, the first heating element 711 and the first adhesive 701 are disposed between the fixing plate 600 and the head chip 9 in the Z-axis direction which is the lamination direction between the fixing plate 600 and the head chip 9.

Such a first heating element 711 is formed by a heating wire. The first heating element 711 may be formed by forming a film on the surface of the flow path forming substrate 15 and the surface of the fixed substrate 47, or may be formed by attaching a heating wire. In addition, when the member to be provided with the first heating element 711 is made of a resin material or a metal material, the first heating element 711 can be integrally provided by insert molding. For such a first heating element 711, for example, it is preferable that the electric resistance coefficient is $1.00\times10^{-6}$ Ω·m or more at room temperature (20° C.). Examples of such a heating wire include a nichrome wire and a kanthal wire. At room temperature (20° C.), the electric resistance coefficient of the nichrome wire is approximately 1.06 to $1.10\times10^{-6}$ Ω·m, and the electric resistance coefficient of the kanthal wire is approximately $1.40\times10^{-6}$ Ω·m. When the member to be provided with the first heating element 711 is made of a conductive material, the first heating element 711 may be provided via a film or sheet having an insulating property. In addition, when the first heating element 711 is covered with an exterior having an insulating property, the first heating element 711 can be directly attached to the member having a conductive property.

As illustrated in FIGS. 4 and 5, an input wiring 721A for the first portion and an output wiring 721B for the first portion are coupled to the first portion 711A of the first heating element 711.

The input wiring 721A for the first portion is formed so that one end is coupled to an end portion of the first portion 711A in the +X direction and the other end is coupled to the end portion of the wiring substrate 80 on the diaphragm 50. The input wiring 721A for the first portion extends over an end surface of the flow path forming substrate 15 in the +X direction, a surface of the flow path forming substrate 15 facing the −Z direction, an end surface of the pressure chamber substrate 10 in the +X direction, an end surface of the diaphragm 50 in the +X direction, and a surface of the diaphragm 50 facing the −Z direction, between the flow path forming substrate 15 and the compliance substrate 45.

The output wiring 721B for the first portion is formed so that one end is coupled to an end portion of the first portion 711A in the −X direction and the other end is coupled to the end portion of the wiring substrate 80 on the diaphragm 50. The output wiring 721B for the first portion extends over an end surface of the flow path forming substrate 15 in the −X direction, a surface of the flow path forming substrate 15 facing the −Z direction, an end surface of the pressure chamber substrate 10 in the −X direction, an end surface of the diaphragm 50 in the −X direction, and a surface of the diaphragm 50 facing the −Z direction, between the flow path forming substrate 15 and the compliance substrate 45.

Such an input wiring 721A for the first portion and an output wiring 721B for the first portion have an electric resistance coefficient lower than that of the first portion 711A. For example, the electric resistance coefficient may be lowered by making the cross-sectional area of the input wiring 721A for the first portion and the output wiring 721B for the first portion larger than the cross-sectional area of the first portion 711A. In addition, as the input wiring 721A for the first portion and the output wiring 721B for the first portion, materials having an electric resistance coefficient lower than that of the first portion 711A may be used. As the material constituting the relay wiring coupled to the heating element, which has a lower electric resistance coefficient than that of the heating wire constituting the heating element, for example, silver ($1.59\times10^{-8}$ Ω·m), copper ($1.68\times10^{-8}$ Ω·m), gold ($2.44\times10^{-8}$ Ω·m), aluminum ($2.65\times10^{-8}$ Ω·m), platinum ($1.06\times10^{-7}$ Ω·m), tin ($1.09\times10^{-7}$ Ω·m), and the like are suitable. These provisions regarding the magnitude of the electric resistance coefficient are the same hereinafter.

In addition, each of the other end portions of the input wiring 721A for the first portion and the output wiring 721B for the first portion is electrically coupled to a wiring (not illustrated) of the wiring substrate 80. The wiring (not illustrated) of the wiring substrate 80 is electrically coupled to an external electrode of the liquid ejecting head 2, that is, an external wiring, via a relay wiring 421A for the first portion, which is the on-substrate wiring 420 of the relay substrate 400. The external wiring here is different from the above-described external wiring 4_a_. Two relay wirings 421A for the first portion are provided for one head chip 9.

Inside the connector 440 of the relay substrate 400 (not illustrated), an input terminal and an output terminal electrically coupled to each of the input wiring 721A for the first portion and the output wiring 721B for the first portion via the relay wiring 421A for the first portion are included. Therefore, the "relay wiring" of the first portion 711A of the present embodiment includes the input wiring 721A for the first portion, the output wiring 721B for the first portion, the wiring (not illustrated) of the wiring substrate 80 coupling each of the input wiring 721A for the first portion and the output wiring 721B for the first portion to the relay wiring 421A for the first portion, the relay wiring 421A for the first portion of the relay substrate 400, and the input terminal and the output terminal (not illustrated) electrically coupled to the relay wiring 421A for the first portion of the connector 440. In addition, the "heating path" corresponding to the first portion 711A of the present embodiment includes the first portion 711A and the "relay wiring" of the first portion 711A described above.

As illustrated in FIGS. 4 and 6, an input wiring 721C for the second portion and an output wiring 721D for the second portion are coupled to the second portion 711B of the first heating element 711.

The input wiring 721C for the second portion is formed so that one end is coupled to an end portion of the second portion 711B in the +X direction and the other end is coupled to the end portion of the wiring substrate 80 on the diaphragm 50. The input wiring 721C for the second portion extends over an end surface of the compliance substrate 45 in the +X direction, an end surface of the flow path forming substrate 15 in the +X direction, a surface of the flow path forming substrate 15 facing the −Z direction, an end surface of the pressure chamber substrate 10 in the +X direction, an end surface of the diaphragm 50 in the +X direction, and a surface of the diaphragm 50 facing the −Z direction.

The output wiring 721D for the second portion is formed so that one end is coupled to an end portion of the second portion 711B in the −X direction and the other end is coupled to the end portion of the wiring substrate 80 on the diaphragm 50. The output wiring 721D for the second portion extends over an end surface of the compliance substrate 45 in the −X direction, an end surface of the flow path forming substrate 15 in the −X direction, a surface of the flow path forming substrate 15 facing the −Z direction, an end surface of the pressure chamber substrate 10 in the −X direction, an end surface of the diaphragm 50 in the −X direction, and a surface of the diaphragm 50 facing the −Z direction.

Each of the input wiring 721C for the second portion and the output wiring 721D for the second portion has an electric resistance coefficient lower than that of the second portion 711B.

In addition, each of the other end portions of the input wiring 721C for the second portion and the output wiring 721D for the second portion is electrically coupled to a wiring (not illustrated) of the wiring substrate 80. The wiring (not illustrated) of the wiring substrate 80 is electrically coupled to an external electrode of the liquid ejecting head 2, that is, an external wiring, via a relay wiring 421B for the second portion, which is the on-substrate wiring 420 provided on the relay substrate 400. As described above, the external wiring here is different from the external wiring 4_a_. Two relay wirings 421B for the second portion are provided for one head chip 9.

Inside the connector 440 of the relay substrate 400 (not illustrated), an input terminal and an output terminal electrically coupled to each of the input wiring 721C for the second portion and the output wiring 721D for the second portion via the relay wiring 421B for the second portion are included. Therefore, the "relay wiring" of the second portion 711B of the present embodiment includes the input wiring 721C for the second portion, the output wiring 721D for the second portion, the wiring (not illustrated) of the wiring substrate 80 coupling each of the input wiring 721C for the second portion and the output wiring 721D for the second portion to the relay wiring 421B for the second portion, the relay wiring 421B for the second portion of the relay substrate 400, and the input terminal and the output terminal (not illustrated) electrically coupled to the relay wiring 421B for the second portion of the connector 440. In addition, the "heating path" corresponding to the second portion 711B of the present embodiment includes the second portion 711B and the "relay wiring" described above. In addition, by making the electric resistance coefficient of the relay wiring lower than the electric resistance coefficient of the first heating element 711, it is possible to reduce the power consumption in the relay wiring and efficiently generate heat of the first heating element 711.

In addition, the first portion 711A and the second portion 711B of the present embodiment are electrically independent of each other. Here, the fact that the first portion 711A and the second portion 711B are electrically independent means that when one is energized, the other is not energized. Specifically, in the case of a DC power supply, the fact means that a first electrical path including the first portion 711A of the first heating element 711, the relay wiring coupled to the first portion 711A, and the input terminal and the output terminal of the connector 440 coupled to the first portion 711A, and a second electrical path including the second portion 711B of the first heating element 711, the relay wiring coupled to the second portion 711B, and the input terminal and the output terminal of the connector 440 coupled to the second portion 711B are not crossed. In addition, the fact that the first portion 711A and the second portion 711B are electrically independent means that in the case of an AC power supply, the output terminal of the connector 440 coupled to the first portion 711A and the output terminal of the connector 440 coupled to the second portion 711B may be coupled to the same ground, and the lines are not crossed in a section other than the ground. The section excluding the ground refers to a section from the input terminal of the connector 440 coupled to the first portion 711A to directly before the ground and a section from the input terminal of the connector 440 coupled to the second portion 711B to directly before the ground. These provisions for being electrically independent are the same hereinafter.

As a matter of course, the first portion 711A and the second portion 711B may be electrically coupled to each other. For example, the first portion 711A and the second portion 711B may be continuously provided or may be partially electrically coupled to each other. In addition, the first portion 711A and the second portion 711B may be electrically coupled to each other by crossing the relay wiring of the first portion 711A and the relay wiring of the second portion 711B in the middle. Crossing the relay wiring includes conducting the input wiring 721A for the first portion and the input wiring 721C for the second portion, and conducting the output wiring 721B for the first portion and the output wiring 721D for the second portion. In addition, crossing the relay wiring includes conducting the relay wiring 421A for the first portion and the relay wiring 421B for the second portion. Furthermore, the input terminals and the output terminals in the connector 440 may be conductive. By electrically coupling the first portion 711A and the second portion 711B in this manner, when a bonding state between the fixing plate 600 and the head chip 9 is released, power can be supplied to both the first portion 711A and the second portion 711B at the same time, and the releasing work can be easily performed.

However, when the first portion 711A and the second portion 711B are electrically independent as in the present embodiment, the closing portion 701A and the main fixing portion 701B of the first adhesive 701 can be individually heated and plasticized. Therefore, when the crack (also known as a fissure) generated in the closing portion 701A is plasticized and repaired, by suppressing the plasticization of the main fixing portion 701B, it is possible to suppress the releasing of the adhesion between the fixing plate 600 and the head chip 9.

In addition, the heating path corresponding to the first portion 711A is electrically provided independently of the printing path. That is, even when the printing path is energized at the time of printing, the first portion 711A of the first heating element 711 is not energized.

Similarly, the heating path corresponding to the second portion 711B is electrically provided independently of the printing path. That is, even when the printing path is energized at the time of printing, the second portion 711B of the first heating element 711 is not energized.

In the present embodiment, the first heating element 711 is provided on the head chip 9, but the configuration is not particularly limited thereto, and the first heating element 711 may be provided on the fixing plate 600. However, in the liquid ejecting head 2, since the fixing plate 600 is exposed to the outside, the fixing plate 600 is likely to fail and is frequently replaced. Therefore, by providing the first heating element 711 on the head chip 9, it is possible to suppress the replacement of the first heating element 711 every time the fixing plate 600 is replaced and to reduce the cost at the time of replacement. In addition, the material of the fixing plate 600 and the laminated member constituting the head chip 9 is not particularly limited. However, the fixing plate 600 is preferably made of metal or the like with high rigidity, and the pressure chamber substrate 10, the protective substrate 30, the flow path forming substrate 15, and the like are preferably made of a silicon substrate that can be processed with high accuracy. Therefore, the first portion 711A, the input wiring 721A for the first portion, the output wiring 721B for the first portion, the input wiring 721C for the second portion, and the output wiring 721D for the second portion of the first heating element 711 are likely to be formed on the silicon substrate side.

In addition, the fixing plate 600 and the holder 100 are bonded to each other by the second adhesive 702 which is an adhesive. That is, the surface of the holder 100 facing the +Z direction where the holding portion 101 is open and the surface of the fixing plate 600 facing the −Z direction are bonded to each other by the second adhesive 702. Such a second adhesive 702 is made of a thermoplastic adhesive, similar to the first adhesive 701. The second adhesive 702 is preferably an adhesive having an insulating property. As a result, it is possible to suppress the current flowing through a second heating element 712 from being transferred to the fixing plate 600. Since the fixing plate 600 and the holder 100 are bonded to each other by the second adhesive 702, the fixing plate 600 can be positioned and then fixed to the holder 100.

In addition, the second heating element 712 that heats and plasticizes the second adhesive 702 is provided at a portion of the liquid ejecting head 2 where the second adhesive 702 is provided. In the present embodiment, the second heating element 712 is provided in a region bonded by the second adhesive 702 on the surface of the holder 100 facing the +Z direction. As a matter of course, the second heating element 712 may be provided on the fixing plate 600 side. However, as described above, by providing the second heating element 712 in the holder 100, it is possible to suppress the replacement of the second heating element 712 every time the fixing plate 600 is replaced and to reduce the cost at the time of replacement. The second heating element 712 and the second adhesive 702 are disposed between the fixing plate 600 and the holder 100 in the Z-axis direction which is the lamination direction between the fixing plate 600 and the holder 100. In addition, the second heating element 712 and the second adhesive 702 are disposed so as to overlap each other when viewed in the Z-axis direction.

Such a second heating element 712 is formed by a heating wire. The second heating element 712 may be formed by forming a film on the surface of the holder 100, or may be formed by attaching a heating wire. In addition, when the member to be provided with the second heating element 712 is made of a resin material or a metal material, the second heating element 712 can be integrally provided by insert molding. For such a second heating element 712, for example, it is preferable that the electric resistance coefficient is $1.00\times10^{-6}$ Ω·m or more. When the member to be provided with the second heating element 712 is made of a conductive material, the second heating element 712 may be provided via a film or sheet having an insulating property. In addition, when the second heating element 712 is covered with an exterior having an insulating property, the second heating element 712 can be directly attached to the member having a conductive property.

As illustrated in FIGS. 3 and 7, an input wiring 722A for the second heating element and an output wiring 722B for the second heating element are coupled to the second heating element 712. One end of the input wiring 722A for the second heating element is coupled to the second heating element 712, and the other end extends over the inner surface of the holding portion 101 and the inner surface of the wiring member insertion hole 104 to the surface of the holder 100 facing the −Z direction. Similarly, one end of the output wiring 722B for the second heating element is coupled to the second heating element 712, and the other end extends over the inner surface of the holding portion 101 and the inner surface of the wiring member insertion hole 104 to the surface of the holder 100 facing the −Z direction.

The other end portions of each of such an input wiring 722A for the second heating element and the output wiring 722B for the second heating element are coupled to the relay wiring 422 for the second heating element, which is the on-substrate wiring 420 formed on the surface of the relay substrate 400 facing the +Z direction (refer to FIG. 9). That is, two relay wirings 422 for the second heating element are provided on the relay substrate 400. In addition, the relay wiring 422 for the second heating element is coupled to the external wiring via the connector 440 fixed to a surface of the relay substrate 400 facing the +Z direction. As described above, the external wiring here is different from the external wiring 4*a*.

Inside the connector 440 of the relay substrate 400 (not illustrated), an input terminal and an output terminal electrically coupled to the input wiring 722A for the second heating element and the output wiring 722B for the second heating element via the relay wiring 422 for the second heating element are included. Therefore, the "relay wiring" of the second heating element 712 of the present embodiment includes the input wiring 722A for the second heating element, the output wiring 722B for the second heating element, the relay wiring 422 for the second heating element of the relay substrate 400, and an input terminal and an output terminal (not illustrated) electrically coupled to the relay wiring 422 for the second heating element of the connector 440. In addition, the "heating path" corresponding to the second heating element 712 of the present embodiment includes the second heating element 712 and the "relay wiring" described above. The heating path corresponding to the second heating element 712 is provided electrically independently of the printing path. That is, even when the printing path is energized at the time of printing, the second heating element 712 is not energized. By making the electric resistance coefficient of the relay wiring of the second heating element 712 lower than the electric resistance coefficient of the second heating element 712, it is possible to reduce the power consumption in the relay wiring and efficiently generate heat of the second heating element 712.

Furthermore, the holder 100 and the head chip 9 are bonded to each other by the third adhesive 703 as described above. Therefore, the third adhesive 703 absorbs the stress acting between the holder 100 and the head chip 9, so that the alignment accuracy of the head chip 9 can be improved. In the head chip 9, a surface of the case member 40 facing the −Z direction and a bottom surface of the holding portion 101 of the holder 100 facing the +Z direction are bonded to each other via the third adhesive 703. The coupling flow path 110 of the holder 100 and the inlet 44 of the head chip 9 are liquid-tightly coupled by the third adhesive 703. That is, by continuously providing the third adhesive 703 around the opening of the coupling flow path 110 and the opening of the inlet 44 in the circumferential direction, the adhesive 703 also functions as a sealing member that seals the communication portion between the coupling flow path 110 and the inlet 44. The third adhesive 703 that bonds such a holder 100 and the head chip 9 is made of a thermoplastic adhesive. The third adhesive 703 is preferably an adhesive having an insulating property. The third adhesive 703 may be provided not only around the communication portion between the coupling flow path 110 and the inlet 44 but also over the entire surface of the case member 40 facing the −Z direction.

The third heating element 713, which is a heating element for heating and plasticizing the third adhesive 703, is provided at a portion of the liquid ejecting head 2 where the third adhesive 703 is provided. In the present embodiment, the third heating element 713 is annularly provided over a region bonded by the third adhesive 703 on the bottom surface of the holding portion 101 of the holder 100 facing the +Z direction, that is, around the opening of the coupling flow path 110. That is, in the present embodiment, one third heating element 713 is provided for the inlet 44, and a total of eight third heating elements 713 are provided in the holder 100. As a matter of course, one third heating element 713 may be continuously provided corresponding to the plurality of head chips 9. In addition, the third heating element 713 may be provided on the case member 40 of the head chip 9. When the third adhesive 703 is provided over the entire surface of the case member 40 facing the −Z direction, the third heating element 713 may be provided over a region facing a surface of the case member 40 of the holder 100 in the Z-axis direction in the −Z direction. That is, the third heating element 713 and the third adhesive 703 are disposed between the fixing plate 600 and the head chip 9 in the Z-axis direction, which is the lamination direction between the holder 100 and the head chip 9. In addition, the third heating element 713 and the third adhesive 703 are disposed so as to overlap each other when viewed in the Z-axis direction.

Such a third heating element 713 is formed by a heating wire. The third heating element 713 may be formed by forming a film on the surface of the holder 100, or may be formed by attaching a heating wire. In addition, when the member to be provided with the third heating element 713 is made of a resin material or a metal material, the third heating element 713 can be integrally provided by insert molding. For such a third heating element 713, for example, it is preferable that the electric resistance coefficient is $1.00\times10^{-6}$ Ω·m or more. When the member to be provided with the third heating element 713 is made of a conductive material, the third heating element 713 may be provided via a film or sheet having an insulating property. In addition, when the third heating element 713 is covered with an exterior having an insulating property, the third heating element 713 can be directly attached to the member having a conductive property.

As illustrated in FIG. 7, the two third heating elements 713 corresponding to the two inlets 44 of one head chip 9 are electrically coupled to each other by the coupling wiring 723A. The coupling wiring 723A is formed on the bottom surface of the holding portion 101 facing the +Z direction. In addition, an input wiring 723B for the third heating element and an output wiring 723C for the third heating element are coupled to the two third heating elements 713 corresponding to one head chip 9. One end of the input wiring 723B for the third heating element is coupled to one third heating element 713 located in the −Y direction, and the other end extends over the inner surface of the holding portion 101 and the inner surface of the wiring member insertion hole 104 to the surface of the holder 100 facing the −Z direction. One end of the output wiring 723C for the third heating element is coupled to another third heating element 713 located in the +Y direction, and the other end extends over the inner surface of the holding portion 101 and the inner surface of the wiring member insertion hole 104 to the surface of the holder 100 facing the −Z direction. Such an input wiring 723B for the third heating element and the output wiring 723C for the third heating element are provided on each of the paired third heating elements 713 corresponding to the head chip 9.

Such a coupling wiring 723A, the input wiring 723B for the third heating element, and the output wiring 723C for the third heating element have an electric resistance coefficient lower than that of the third heating element 713.

The other end portions of each of such an input wiring 723B for the third heating element and the output wiring 723C for the third heating element are coupled to the relay wiring 423 for the third heating element, which is the on-substrate wiring 420 formed on the surface of the relay substrate 400 facing the +Z direction (refer to FIG. 9). That is, the relay substrate 400 includes two relay wirings 423 for the third heating element for each head chip 9. The relay wiring 423 for the third heating element is coupled to the external wiring via the connector 440 fixed to a surface of the relay substrate 400 facing the +Z direction. As described above, the external wiring here is different from the external wiring 4*a*.

That is, inside the connector 440 of the relay substrate 400 (not illustrated), an input terminal and an output terminal electrically coupled to the input wiring 723B for the third heating element and the output wiring 723C for the third heating element via the relay wiring 423 for the third heating element are included. Therefore, the "relay wiring" of the third heating element 713 of the present embodiment includes the input wiring 723B for the third heating element, the output wiring 723C for the third heating element, the relay wiring 423 for the third heating element of the relay substrate 400, and an input terminal and an output terminal (not illustrated) electrically coupled to the relay wiring 423 for the third heating element of the connector 440. In addition, the "heating path" corresponding to the third heating element 713 of the present embodiment includes the third heating element 713 and the "relay wiring" described above. The heating path corresponding to the third heating element 713 is electrically provided independently of the printing path. That is, even when the printing path is energized at the time of printing, the third heating element 713 is not energized. By making the electric resistance coefficient of the relay wiring of the third heating element 713 lower than the electric resistance coefficient of the third heating element 713, it is possible to reduce the power consumption in the relay wiring and efficiently generate heat of the third heating element 713.

External wiring (not illustrated) electrically couples a power supply device (not illustrated) that is not a part of the liquid ejecting apparatus 1, the input terminal and the output terminal electrically coupled to the relay wiring 421A for the first portion of the connector 440, the input terminal and the output terminal electrically coupled to the relay wiring 421B for the second portion of the connector 440, the input terminal and the output terminal electrically coupled to the relay wiring 422 for the second heating element of the connector 440, and the input terminal and the output terminal (not illustrated) electrically coupled to the relay wiring 423 for the third heating element of the connector 440. By supplying power from the power supply device to the relay wiring 421A for the first portion, the relay wiring 421B for the second portion, the relay wiring 422 for the second heating element, and the relay wiring 423 for the third heating element via the external wiring, the first portion 711A, the second portion 711B, the second heating element 712, and the third heating element 713 generate heat. The external wiring is not electrically coupled to the printing path. In addition, since each of the heating paths of the plurality of heating elements is electrically independent, it is possible to selectively generate heat of only a part of the first portion 711A, the second portion 711B, the second heating element 712, and the third heating element 713.

In the liquid ejecting head 2 having such a configuration, the adhesive can be plasticized by causing the heating element to generate heat to heat the adhesive. In the present embodiment, the first heating element 711, the second heating element 712, and the third heating element 713 are provided as the heating elements. Therefore, the first heating element 711 can plasticize the first adhesive 701, the second heating element 712 can plasticize the second adhesive 702, and the third heating element 713 can plasticize the third adhesive 703. In addition, in the present embodiment, the first heating element 711, the second heating element 712, and the third heating element are electrically independent of each other. Therefore, the plasticization of the first adhesive 701 with the first heating element 711, the plasticization of the second adhesive 702 with the second heating element 712, and the plasticization of the third adhesive 703 with the third heating element can be performed independently of each other. In addition, the first heating element 711 and the third heating element 713 are electrically independently provided for each head chip 9. Therefore, the plasticization of the first adhesive 701 with the first heating element 711 and the plasticization of the third adhesive 703 with the third heating element 713 can be performed independently for each head chip 9. Furthermore, the first portion 711A and the second portion 711B of the first heating element 711 provided for one head chip 9 are electrically independent of each other. Therefore, the plasticization of the closing portion 701A by the first portion 711A and the plasticization of the main fixing portion 701B by the second portion 711B can be performed independently.

Here, the plasticization of the adhesive includes softening and melting of the adhesive. The softening of the adhesive means that the adhesive is softened by being heated. In addition, melting the adhesive means liquefying the adhesive by being heated. For example, when the closing portion 701A of the first adhesive 701 is cracked or the like due to an attack of ink, the cracks in the closing portion 701A can be repaired by heating and melting the closing portion 701A of the first adhesive 701 with the first heating element 711. As a matter of course, the same applies to the main fixing portion 701B. In addition, similarly, for the second heating element 712, the crack in the second adhesive 702 can be repaired by melting the second adhesive 702 with the second heating element 712. Similarly, for the third heating element 713, the crack in the third adhesive 703 can be repaired by melting the third adhesive 703 with the third heating element 713.

In addition, by plasticizing the first adhesive 701 with the first heating element 711 and plasticizing the second adhesive 702 with the second heating element 712, the adhesion between the fixing plate 600 and the holder 100 and the head chip 9 can be released.

Here, the fixing plate 600 may fail for the following reasons, for example.

In the liquid ejecting apparatus 1, the medium S is clogged, a so-called paper jam, occurs while the medium S is being transported, and the medium S comes into contact with the fixing plate 600, so that the fixing plate 600 is deformed.

In the liquid ejecting apparatus 1, the load when the suction cap (not illustrated) that sucks the ink from the nozzle 21 comes into contact with the fixing plate 600 is deformed when the load is equal to or greater than the expected load for some reason.

In the liquid ejecting apparatus 1, when the surfaces of the nozzle plate 20 and the fixing plate 600 facing the +Z direction are wiped with a wiping member such as a wiper blade (not illustrated), the liquid repellent film formed on the surface of the fixing plate 600 is peeled off.

When a failure occurs in such a fixing plate 600, by plasticizing the first adhesive 701 with the first heating element 711 and plasticizing the second adhesive 702 with the second heating element 712, the bonding state between the fixing plate 600 and the holder 100 and the head chip 9 can be released, and the fixing plate 600 can be replaced with a new product. That is, the first heating element 711 and the second heating element 712 plasticize the first adhesive 701 and the second adhesive 702, so that the failed fixing plate 600 is removed from the holder 100 and the head chip 9. In a state where a new fixing plate 600A is abutted on each of the holder 100 and the head chip 9 via the second adhesive 702 and the first adhesive 701, heat generation of the first heating element 711 and the second heating element 712 is stopped. As a result, the temperature of the first adhesive 701 and the second adhesive 702 is lowered to cure the first adhesive 701 and the second adhesive 702, and the holder 100, the head chip 9, and the new fixing plate 600A can be bonded to each other. When the fixing plate 600 is replaced, it is preferable that the plasticization of the first adhesive 701 and the second adhesive 702 is softened. By softening the first adhesive 701 and the second adhesive 702, when the fixing plate 600 is replaced, the first adhesive 701 and the second adhesive 702 are easily removed, and a new fixing plate 600 can be bonded to each other by a new first adhesive 701 and a new second adhesive 702. That is, when the first adhesive 701 and the second adhesive 702 are softened and the fixing plate 600 is removed, the first adhesive 701 and the second adhesive 702 are attached to any one of the fixing plate 600, the head chip 9, and the holder 100, and each of the first adhesive 701 and the second adhesive 702 is a lump and is easily removed. On the other hand, for example, when the first adhesive 701 and the second adhesive 702 are melted and the fixing plate 600 is removed, the first adhesive 701 and the second adhesive 702 are attached to both the fixing plate 600 and the head chip 9 and the holder 100, the first adhesive 701 and the second adhesive 702 attached to both are required to be wiped off, and it is troublesome to wipe off cleanly.

In the above-described example, the configuration in which the bonding state between the fixing plate 600 and the holder 100 and the head chip 9 is released, and the fixing plate 600 is replaced with a new product is described, but the configuration is not particularly limited thereto. For example, the bonding state of the fixing plate 600, the holder 100, and the head chip 9 is released, and a unit in which the holder 100 and the head chip 9 are bonded to each other may be replaced with a new product. In addition, the first adhesive 701 and the second adhesive 702 may be replaced with new products when the bonding state between the fixing plate 600 and the holder 100 and the head chip 9 is released.

In addition, after releasing the bonding state of the fixing plate 600, the holder 100, and the head chip 9, the third adhesive 703 is plasticized with the third heating element 713, so that the bonding state between the holder 100 and the head chip 9 can be released.

Here, the head chip 9 may fail for the following reasons, for example.

The piezoelectric actuator 60 does not normally operate due to the life thereof.

In the liquid ejecting apparatus, the nozzle plate 20 is wiped with a wiping member, so that the liquid repellent film on the surface of the nozzle plate 20 is peeled off.

When such a failure of the head chip 9 occurs, the third adhesive 703 is plasticized with the third heating element 713, the bonding state between the head chip 9 and the holder 100 is released, and the head chip 9 can be replaced with a new product. That is, the third heating element 713 plasticizes the third adhesive 703 to remove the failed head chip 9 from the holder 100. In a state where a new head chip 9A is abutted on the holder 100 via the third adhesive 703, the heat generation of the third heating element 713 is stopped. As a result, the temperature of the third adhesive 703 is lowered to cure the third adhesive 703, and the holder 100 and the new head chip 9A can be bonded to each other. When the head chip 9 is replaced, it is preferable that the plasticization of the third adhesive 703 is softened, similar to the replacement of the fixing plate 600. By softening the third adhesive 703, when the head chip 9 is replaced, the third adhesive 703 can be easily removed and the new head chip 9A can be bonded to each other by a new third adhesive 703.

In the above-described example, the configuration in which the bonding state between the holder 100 and the head chip 9 is released and the head chip 9 is replaced with a new product is described, but the configuration is not particularly limited thereto. For example, the bonding state between the holder 100 and the head chip 9 is released, and the holder 100 may be replaced with a new product. In addition, the third adhesive 703 may be replaced with a new product when the bonding state between the holder 100 and the head chip 9 is released.

In addition, in the present embodiment, the paired third heating elements 713 provided for each head chip 9 are electrically independent for each head chip 9. Therefore, the third adhesive 703 can be selectively plasticized by selectively energizing the third heating element 713 corresponding to the failed head chip 9. Therefore, only the failed head chip 9 can be replaced, and it is not necessary to replace all the head chips 9 including a normal head chip 9 at the same time. In addition, when replacing the failed head chip 9, it is possible to prevent the normal head chip 9 from being removed from the holder 100, so that the failed head chip 9 can be easily replaced.

As the first adhesive 701, the second adhesive 702, and the third adhesive 703, it is preferable to use a material having a softening point lower than the boiling point of the ink. This is because when the first adhesive 701, the second adhesive 702, and the third adhesive 703 are plasticized by each of the first heating element 711, the second heating element 712, and the third heating element 713, by heating at a temperature lower than the boiling point of ink, it is possible to prevent the ink remaining in the liquid ejecting head 2 from being a foreign matter. Therefore, it is possible to suppress an ink ejection failure or the like due to the foreign matter in the ink. In particular, as the third adhesive 703 constituting the flow path of the ink, it is preferable to use a material having a softening point lower than the boiling point of the ink.

In addition, when at least one of the case member 40 to which the third adhesive 703 is applied to the head chip 9 and the holder 100 to which the third adhesive 703 is applied is a thermoplastic resin, the melting point of the thermoplastic resin is preferably higher than the softening point of the third adhesive 703. By setting the melting point of the thermoplastic resin to be higher than the softening point of the third adhesive 703 in this manner, when the third heating element 713 plasticizes the third adhesive 703, the melting of the thermoplastic resin can be suppressed. The softening point of the thermoplastic resin is more preferably higher than the softening point of the third adhesive 703. In addition, the melting point of the thermoplastic resin is preferably higher than the melting point of the third adhesive 703. More preferably, the softening point of the thermoplastic resin is higher than the melting point of the third adhesive 703.

In the liquid ejecting head 2 in the present embodiment, the holder 100 and the fixing plate 600 bonded to the head chip 9 correspond to "another member different from the head chip". In addition, the first adhesive 701 and the third adhesive 703 correspond to an "adhesive that bonds the head chip to the other member". Furthermore, the first heating element 711 and the third heating element 713 correspond to a "heating element that plasticizes an adhesive bonding the head chip to the other member". However, only the fixing plate 600 may be "another member different from the head chip", only the first adhesive 701 may be an "adhesive that bonds the head chip and the other member", and only the first heating element 711 may be a "heating element that plasticizes an adhesive bonding the head chip and the other member". Similarly, only the holder 100 may be "another member different from the head chip", only the third adhesive 703 may be an "adhesive that bonds the head chip and the other member", and only the third heating element 713 may be a "heating element that plasticizes an adhesive bonding the head chip and the other member".

In addition, in the liquid ejecting head 2 in the present embodiment, the second adhesive 702 corresponds to an "adhesive that bonds the fixing plate and the holder". In addition, the second heating element 712 corresponds to a "heating element that plasticizes the adhesive bonding the fixing plate and the holder".

Method of Manufacturing Liquid Ejecting Head

As an example of a method of manufacturing the liquid ejecting head 2 according to Embodiment 1, a method of replacing the fixing plate 600 will be specifically described. The same members as those in Embodiment 1 described above are designated by the same reference numerals, and redundant descriptions will be omitted. In addition, FIGS. 10 and 11 are cross-sectional views of the main parts illustrating the method of manufacturing the liquid ejecting head 2.

Figure 10:
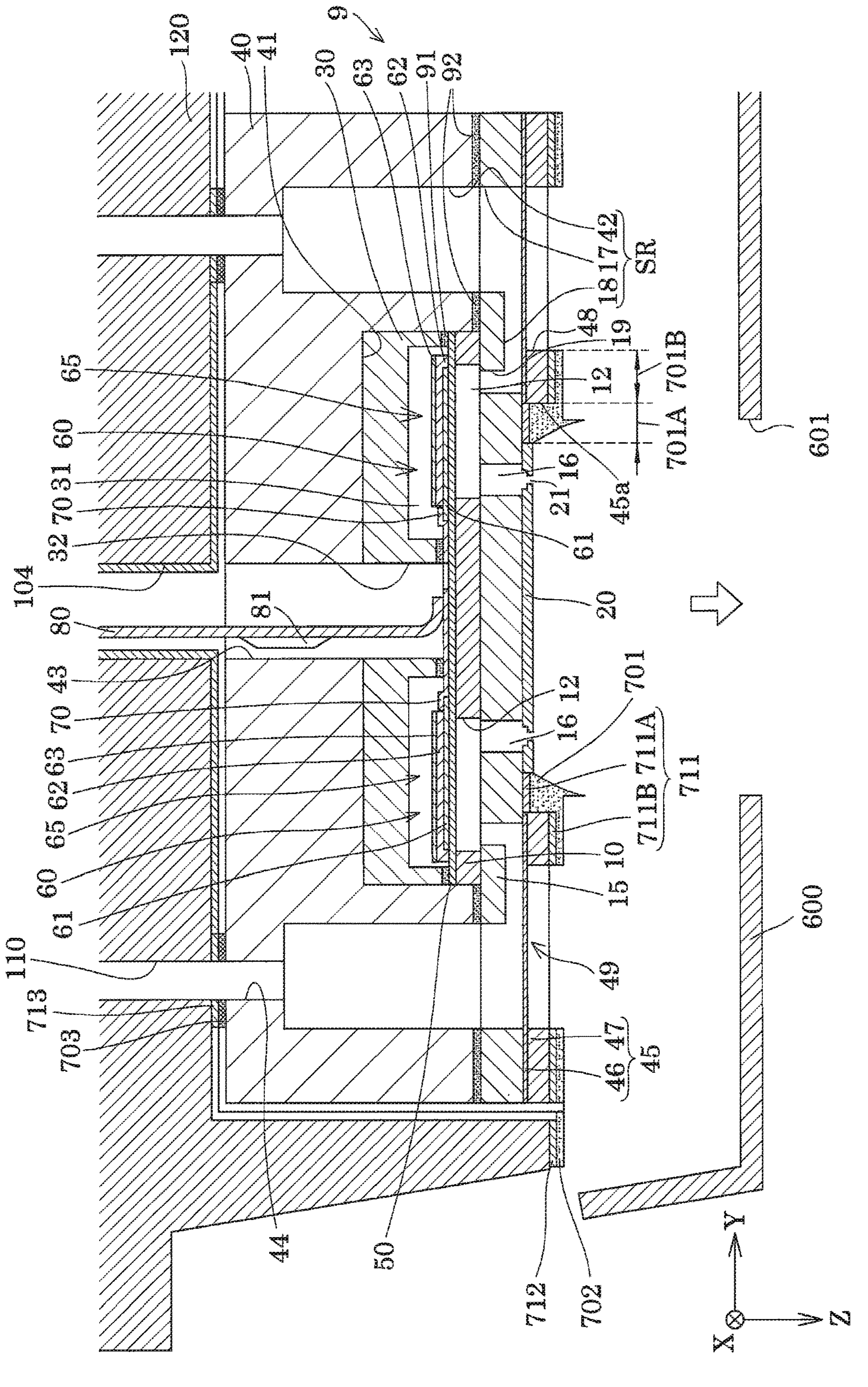
FIG. 10 is a cross-sectional view of a main part for describing a method of manufacturing the liquid ejecting head according to Embodiment 1.
Figure 11:
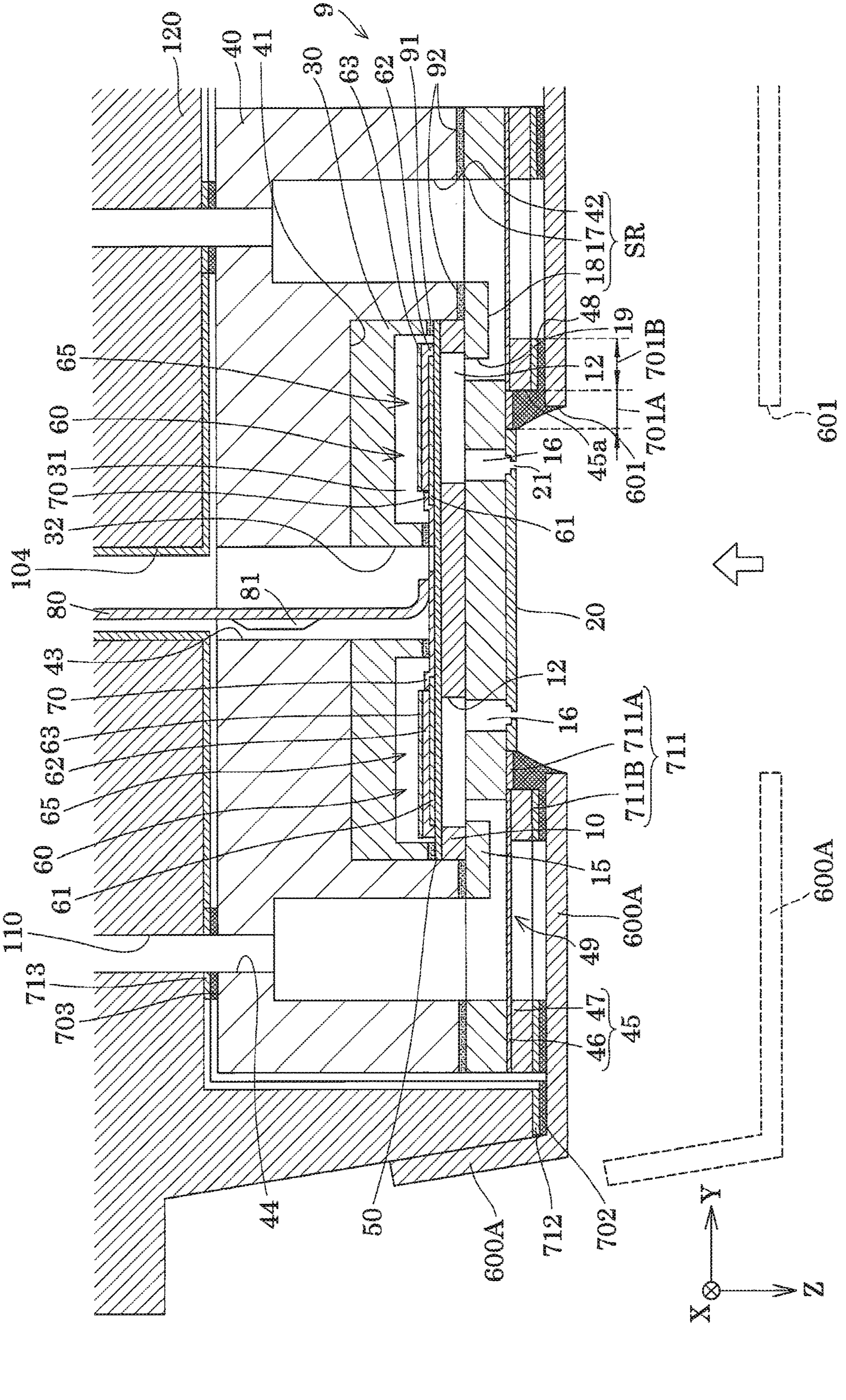
FIG. 11 is a cross-sectional view of a main part for describing a method of manufacturing the liquid ejecting head according to Embodiment 1.

As illustrated in FIG. 10, a heating step is performed in which the first heating element 711 and the second heating element 712 are caused to generate heat to heat the first adhesive 701 and the second adhesive 702, and the first adhesive 701 and the second adhesive 702 are plasticized. In addition, by plasticizing the first adhesive 701 and the second adhesive 702 by the heating step, a disassembling step of releasing the bonding state between the holder 100 and the head chip 9 and the fixing plate 600 is performed. That is, in the heating step, the third adhesive 703 that bonds the plurality of head chips 9 and the holder 100 is not plasticized.

Here, in the heating step, the first heating element 711 and the second heating element 712 are caused to generate heat by supplying power to the first heating element 711 and the second heating element 712 built into the liquid ejecting head 2. In addition, in the heating step, power is supplied to the first heating element 711 and the second heating element 712 through the input terminal and the output terminal (not illustrated) exposed to the outside of each connector 440 of the relay wiring 421A for the first portion, the relay wiring 421B for the second portion, and the relay wiring 422 for the second heating element to cause the first heating element 711 and the second heating element 712 to generate heat. The input terminal and the output terminal (not illustrated) exposed to the outside of the connector 440 are an example of an "end portion of the relay wiring exposed to the outside of the liquid ejecting head and coupled to the heating element". In order to plasticize the first adhesive 701 and the second adhesive 702 with the first heating element 711 and the second heating element 712 built into the liquid ejecting head 2, the disassembling step can be performed in a state where the first adhesive 701 and the second adhesive 702 are heated with the first heating element 711 and the second heating element 712. Therefore, the heating step and the disassembling step can be performed in parallel, and the temperature of the first adhesive 701 and the second adhesive 702 is not lowered in the middle of the disassembling step, so that the disassembling step can be easily performed.

In addition, in the heating step, the first adhesive 701 and the second adhesive 702 are heated at a temperature at which the first adhesive 701 and the second adhesive 702 are plasticized but the head chip 9 and the fixing plate 600 are not plasticized. That is, materials for the first adhesive 701, the second adhesive 702, the head chip 9, and the fixing plate 600 are selected, so that the temperature at which the first adhesive 701 and the second adhesive 702 are plasticized is lower than the temperature at which the laminated member and the fixing plate 600 constituting the head chip 9 are plasticized. The temperature at which the first adhesive 701 and the second adhesive 702 are plasticized is a melting point, which is a melting temperature, or a softening point, which is a softening temperature. In addition, the temperature at which the head chip 9 and the fixing plate 600 are plasticized is a softening point. That is, when the first adhesive 701 and the second adhesive 702 are softened in the heating step, the softening points of the first adhesive 701 and the second adhesive 702 are made lower than the softening points of the head chip 9 and the fixing plate 600. In addition, when the first adhesive 701 and the second adhesive 702 are melted in the heating step, the melting points of the first adhesive 701 and the second adhesive 702 are made lower than the softening points of the head chip 9 and the fixing plate 600. As a result, when the first adhesive 701 and the second adhesive 702 are plasticized in the heating step, by suppressing plasticization of the head chip 9 and the fixing plate 600, deformation and disassembly of the head chip 9 and the fixing plate 600 due to plasticization can be suppressed.

In addition, in the present embodiment, a temperature at which the first adhesive 701 and the second adhesive 702 are plasticized, and a temperature at which the head chip 9 and the fixing plate 600 are plasticized are defined, but the configuration is not particularly limited thereto. The same definition can be applied to the combination of the third adhesive 703 with the holder 100 and the head chip 9 as well. That is, in the heating step, the third adhesive 703 is plasticized, but the head chip 9 and the holder 100 may heat the third heating element at a temperature at which the third adhesive 703 is not plasticized.

In addition, when the adhesive that bonds the laminated members of the head chips 9, for example, the first laminating adhesive 91 and the second laminating adhesive 92, is a thermoplastic adhesive, in the heating step, the first adhesive 701 and the second adhesive 702 are softened while the first adhesive 701 and the second adhesive 702 are heated at a temperature at which the adhesive that bonds the laminated members of the head chip 9, for example, the first laminating adhesive 91 and the second laminating adhesive 92, is not melted. That is, the softening points of the first adhesive 701 and the second adhesive 702 are lower than the melting point of the adhesive that bonds the laminated members. By using the first adhesive 701 and the second adhesive 702, which have a softening point lower than the melting point of the adhesive that bonds the laminated members in this manner, when the first heating element 711 and the second heating element 712 heat the first adhesive 701 and the second adhesive 702, the adhesive that bonds the laminated members does not melt, and it is possible to suppress the disassembly of the head chip 9, the positional displacement of the laminated members, and the like.

In addition, when the adhesive that bonds the laminated members of the head chips 9, for example, the first laminating adhesive 91 and the second laminating adhesive 92, is a thermoplastic adhesive, in the heating step, the first adhesive 701 and the second adhesive 702 are melted while the first adhesive 701 and the second adhesive 702 may be heated at a temperature at which the adhesive that bonds the laminated members of the head chip 9, for example, the first laminating adhesive 91 and the second laminating adhesive 92, is not melted. That is, the melting point of the first adhesive 701 and the second adhesive 702 is lower than the melting point of the adhesive that bonds the laminated members. By using the first adhesive 701 and the second adhesive 702, which have a melting point lower than the melting point of the adhesive that bonds the laminated members in this manner, when the first heating element 711 and the second heating element 712 heat the first adhesive 701 and the second adhesive 702, the adhesive that bonds the laminated members does not melt, and it is possible to suppress the disassembly of the head chip 9 and the positional displacement of the laminated members.

In addition, when the adhesive that bonds the laminated members of the head chips 9, for example, the first laminating adhesive 91 and the second laminating adhesive 92, is a thermoplastic adhesive, in the heating step, the first adhesive 701 and the second adhesive 702 are melted while the first adhesive 701 and the second adhesive 702 may be heated at a temperature at which the adhesive that bonds the laminated members of the head chip 9, for example, the first laminating adhesive and the second laminating adhesive, is not softened. That is, the melting points of the first adhesive 701 and the second adhesive 702 are lower than the softening points of the adhesive that bonds the laminated members. By using the first adhesive 701 and the second adhesive 702, which have a melting point lower than the softening point of the adhesive that bonds the laminated members in this manner, when the first heating element 711 and the second heating element 712 heat the first adhesive 701 and the second adhesive 702, the adhesive that bonds the laminated members does not soften, and it is possible to suppress the disassembly of the head chip 9 and the positional displacement of the laminated members.

In addition, when the adhesives that bond the laminated members of the head chips 9, for example, the first laminating adhesive 91 and the second laminating adhesive 92, are the thermoplastic adhesives, although the first adhesive 701 and the second adhesive 702 are softened in the heating step, the first adhesive 701 and the second adhesive 702 are preferably heated at a temperature at which the adhesives that bond the laminated members of the head chip 9, for example, the first laminating adhesive 91 and the second laminating adhesive 92, are not softened. That is, the softening points of the first adhesive 701 and the second adhesive 702 are lower than the softening points of the adhesives that bond the laminated members. By using the first adhesive 701 and the second adhesive 702, which have a softening point lower than the softening point of the adhesive that bonds the laminated members in this manner, when the first heating element 711 and the second heating element 712 heat the first adhesive 701 and the second adhesive 702, it is possible to suppress the softening of the adhesive that bonds the laminated members. Therefore, by suppressing the softening of the adhesive that bonds the laminated members, it is possible to further suppress the disassembly of the head chip 9 and to further suppress the positional displacement of the laminated members, and the like compared to the case where the melting of the adhesive that bonds the laminated members is suppressed. By softening the first adhesive 701 and the second adhesive 702 instead of melting these adhesives, it is easy to remove the first adhesive 701 and the second adhesive 702 as lumps.

The definition of the melting point or softening point of the first adhesive 701 and the second adhesive 702 and the melting point or softening point of the adhesive that bonds the laminated members of the head chip 9 described above can be similarly defined for the third adhesive 703. In addition, although the melting point or softening point of the first adhesive 701, the second adhesive 702, and the third adhesive 703 and the melting point or softening point of the adhesive that bonds the laminated members of the head chips 9 are defined, the configuration is not particularly limited thereto. For example, when one or both of the holder 100 and the fixing plate 600 is configured by laminating a plurality of laminated members with an adhesive, the melting point or softening point of the first adhesive 701, the second adhesive 702, and the third adhesive 703 may be compared with the melting point or softening point of the adhesive that bonds the laminated members of the holder 100 or the adhesive that bonds the laminated members of the fixing plate 600.

In addition, in the above-described example, the temperatures of the first adhesive 701, the second adhesive 702, and the third adhesive 703 are compared with the temperature of the adhesive that bonds the laminated members, but the configuration is not particularly limited thereto. For example, the disassembling step may be performed before the adhesive that bonds the laminated members is plasticized. That is, for example, even when the temperature at which the first adhesive 701, the second adhesive 702, and the third adhesive 703 are plasticized and the temperature at which the adhesive that bonds the laminated members is plasticized are the same as each other, the time until the adhesive that bonds the laminated members disposed at a position far from the heating element is plasticized is longer than the time until the first adhesive 701, the second adhesive 702, and the third adhesive 703 are plasticized. Therefore, even when the temperature at which both are plasticized is the same, the first adhesive 701, the second adhesive 702, and the third adhesive 703 can be plasticized and subjected to the disassembling step before the adhesive that bonds the laminated members is plasticized.

Next, as illustrated in FIG. 11, a replacing step of replacing the fixing plate 600 removed by the disassembling step with a new fixing plate 600A is performed. In the replacing step, the new fixing plate 600A is bonded to the holder 100 and the head chip 9 by the first adhesive 701 and the second adhesive 702. That is, in a state where the first adhesive 701 and the second adhesive 702 are heated and plasticized with the first heating element 711 and the second heating element 712, the new fixing plate 600A is abutted on the head chip 9 and the holder 100. In a state where the fixing plate 600A is abutted on the head chip 9 and the holder 100, by stopping the heating of the first adhesive 701 and the second adhesive 702 with the first heating element 711 and the second heating element 712, the temperature of the first adhesive 701 and the second adhesive 702 is lowered to cure these adhesives, and the new fixing plate 600A, the head chip 9, and the holder 100 are bonded to each other. The temperature at which the first adhesive 701 and the second adhesive 702 are heated in the heating step is preferably lower than the temperature at which the first adhesive 701 and the second adhesive 702 are heated in the replacing step. That is, in the heating step, the first adhesive 701 and the second adhesive 702 are softened and are likely to be disassembled, and in the replacing step, by melting the first adhesive 701 and the second adhesive 702, the adhesive strength between the fixing plate 600A and the head chip 9 and the holder 100 can be improved.

In addition, the time for heating the first adhesive 701 and the second adhesive 702 in the heating step is preferably shorter than the time for heating the first adhesive 701 and the second adhesive 702 in the replacing step. That is, in the heating step, the first adhesive 701 and the second adhesive 702 are heated and softened in a short time and are likely to be disassembled, and in the replacing step, by heating and melting the first adhesive 701 and the second adhesive 702 for a relatively long time, the adhesive strength between the fixing plate 600A and the head chip 9 and the holder 100 can be improved.

In addition, the first adhesive 701 and the second adhesive 702 may be replaced with new products in the replacing step. When the new first adhesive 701 and the second adhesive 702 are used, the new first adhesive 701 and the second adhesive 702 may be applied by being heated and plasticized by a heating unit such as an external heater without being heated with the first heating element 711 and the second heating element 712. Even when the first adhesive 701 and the second adhesive 702 are replaced, the temperature at which the first adhesive 701 and the second adhesive 702 are heated in the heating step is preferably lower than the temperature at which the first adhesive 701 and the second adhesive 702 are heated in the replacing step. Alternatively, even when the first adhesive 701 and the second adhesive 702 are replaced, the time for heating the first adhesive 701 and the second adhesive 702 in the heating step is preferably shorter than the time for heating the first adhesive 701 and the second adhesive 702 in the replacing step. With this configuration, it is easy to replace the first adhesive 701 and the second adhesive 702 in the heating step.

By replacing the fixing plate 600, which is one component of the liquid ejecting head 2, with a new product in this manner, the liquid ejecting head 2 can be regenerated. Therefore, waste can be reduced and the cost can be reduced as compared with the case where the entire liquid ejecting head 2 is replaced.

In the present embodiment, the fixing plate 600 is replaced with the new fixing plate 600A, but the configuration is not limited thereto. For example, the head chip 9 and the holder 100 may be replaced with new products. In the replacing step, any one of the head chip 9, the holder 100, and the fixing plate 600 may be replaced with a new product.

In addition, the heating step, the disassembling step, and the replacing step may be performed on the head chip 9 and the holder 100 disassembled into the fixing plate 600 by the disassembling step described above. That is, in the heating step, the third adhesive 703 is heated and plasticized by energizing the third heating element 713 to generate heat for the head chip 9 and the holder 100 from which the fixing plate 600 is removed. Next, in the disassembling step, the third adhesive 703 is plasticized by the heating step to release the bonding state between the holder 100 and the head chip 9. Thereafter, in the replacing step, either one of the head chip 9 and the holder 100 is replaced with a new product. In the present embodiment, the third heating element 713 is provided for each head chip 9, and the third heating element 713 of each head chip 9 is electrically independent. Therefore, only the failed head chip 9 can be selectively removed from the holder 100, and it is possible to suppress the release of the bonding state between the non-failed head chip 9 and the holder 100. Therefore, when the third heating element 713 is caused to generate heat, it is possible to prevent the non-failed head chip 9 from being displaced or being removed from the holder 100. As a matter of course, when all the head chips 9 are replaced, the third heating element 713 provided corresponding to each head chip 9 may be electrically conductive. When the head chip 9 is removed from the holder 100, by heating the solder or conductive adhesive that couples the wiring substrate 80 and the relay substrate 400 from the outside of the liquid ejecting head 2 by a heating unit such as a heater, it is preferable to release the coupling between the wiring substrate 80 and the relay substrate 400. In addition to replacing the head chip 9 with the holder 100, the holder 100 may be replaced with the head chip 9.

Modification Example 1

Figure 12:
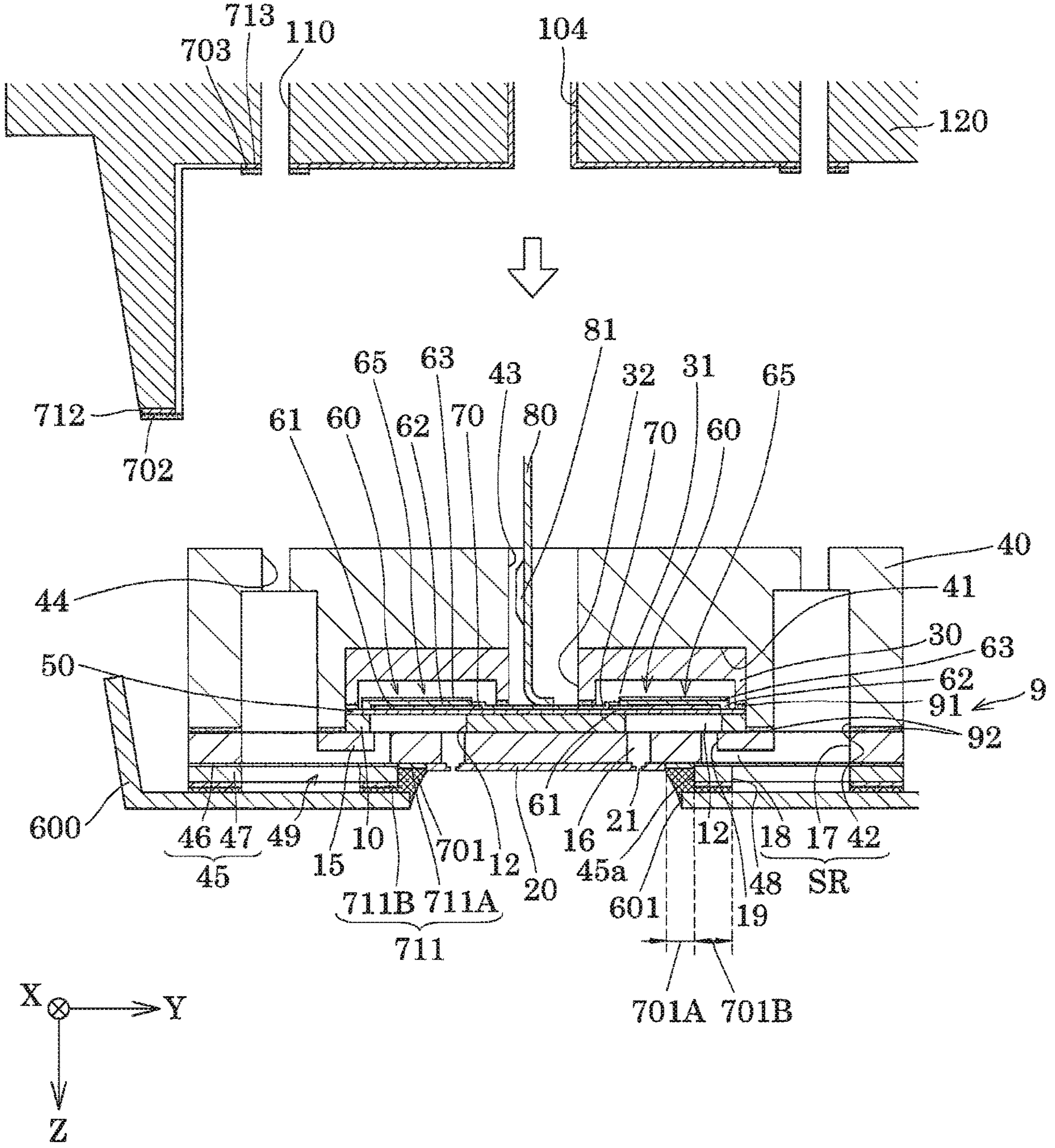
FIG. 12 is a cross-sectional view of a main part for describing Modification Example 1 of a method of manufacturing a liquid ejecting head.
Figure 13:
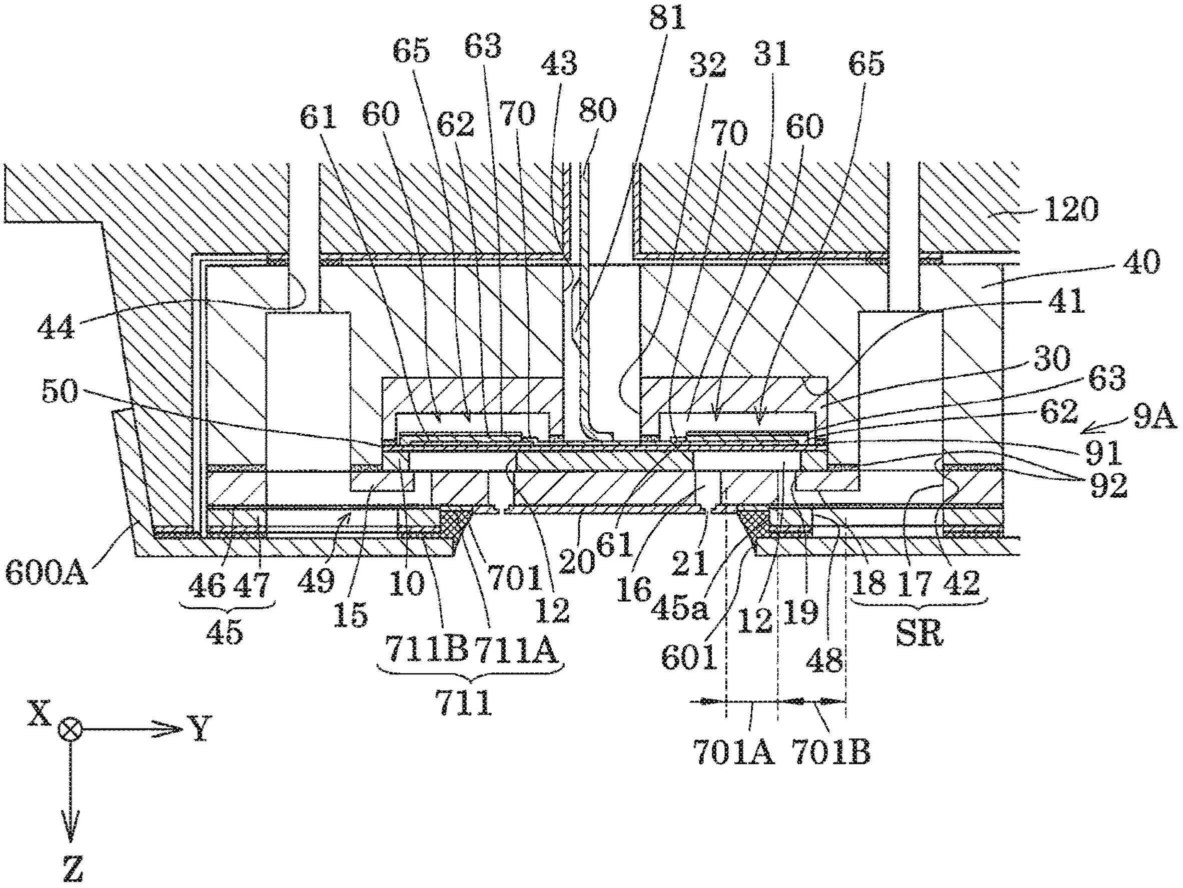
FIG. 13 is a cross-sectional view of a main part for describing Modification Example 1 of the method of manufacturing the liquid ejecting head.

FIGS. 12 and 13 are cross-sectional views of the main parts for describing Modification Example 1 of the method of manufacturing the liquid ejecting head 2 according to Embodiment 1. The same members as those in Embodiment 1 described above are designated by the same reference numerals, and redundant descriptions will be omitted.

As illustrated in FIG. 12, a heating step is performed in which the second heating element 712 and the third heating element are caused to generate heat to heat the second adhesive 702 and the third adhesive 703 and the second adhesive 702 and the third adhesive 703 are plasticized. In addition, by plasticizing the second adhesive 702 and the third adhesive 703 by the heating step, a disassembling step of releasing the bonding state between the plurality of head chips 9 and the fixing plate 600 and the holder 100 is performed. That is, in the heating step, the first adhesive 701 that bonds the plurality of head chips 9 and the fixing plate 600 is not plasticized. Therefore, in the disassembling step, the plurality of head chips 9 and the fixing plate 600 are disassembled by releasing the bonding state between a unit and the holder 100, which are integrated with the first adhesive 701.

The relationship between the temperature at which the second adhesive 702 and the third adhesive 703 are plasticized and the temperature at which the head chip 9, the fixing plate 600, and the holder 100 are plasticized in the heating step is the same as the relationship between the temperature at which the first adhesive 701 and the second adhesive 702 described above are plasticized and the temperature at which the head chip 9 and the fixing plate 600 are plasticized. That is, the temperature at which the second adhesive 702 and the third adhesive 703 are plasticized is lower than the temperature at which the head chip 9, the fixing plate 600, and the holder 100 are plasticized. As a result, when the second adhesive 702 and the third adhesive 703 are heated in the heating step, plasticization of the head chip 9, the fixing plate 600, and the holder 100 can be suppressed.

In addition, the relationship between the melting point and softening point at which the second adhesive 702 and the third adhesive 703 are plasticized in the heating step, and the melting point and softening point at which the first laminating adhesive 91 and the second laminating adhesive 92, which are adhesives that bond the laminated members of the head chip 9, are plasticized is similar to the relationship between the melting point and softening point at which the first adhesive 701 and the second adhesive 702 described above are plasticized, and the melting point and softening point at which the adhesive that bonds the laminated members of the head chip 9 is plasticized.

Next, as illustrated in FIG. 13, the unit including the head chip 9 and the fixing plate 600 removed in the disassembling step is replaced with a new product. In the replacing step, the new unit is bonded to the holder 100 by the second adhesive 702 and the third adhesive 703. That is, in a state where the second adhesive 702 and the third adhesive 703 are heated and plasticized with the second heating element 712 and the third heating element 713, a new unit, that is, a new head chip 9A and a new fixing plate 600A are abutted on the holder 100. In a state where the new head chip 9A and the new fixing plate 600A are abutted on the holder 100, by stopping the heating of the second adhesive 702 and the third adhesive 703 with the second heating element 712 and the third heating element 713, the temperature of the second adhesive 702 and the third adhesive 703 is lowered to cure these adhesives, and the new head chip 9A, the new fixing plate 600A, and the holder 100 are bonded to each other. The second adhesive 702 and the third adhesive 703 may be replaced with new products in the replacing step. When the new second adhesive 702 and the third adhesive 703 are used, the new second adhesive 702 and the third adhesive 703 may be applied by being heated and plasticized by a heating unit such as an external heater without being heated with the second heating element 712 and the third heating element.

By replacing the unit including the plurality of head chips 9 and the fixing plate 600 in this manner, it is possible to simplify the replacement work as compared with the case where each head chip 9 is replaced.

In addition, in the unit including the plurality of head chips 9 and the fixing plate 600, since the plurality of head chips 9 are bonded to the fixing plate 600 by the first adhesive 701, the positions of the nozzles 21 of the plurality of head chips 9 are positioned via the fixing plate 600. Therefore, by replacing the unit with a new product, the head chips 9 can be bonded to the holder 100 in a state of being positioned with high accuracy. Therefore, it is possible to suppress the landing position displacement of the liquid ejected from the nozzle 21 on the medium S and perform high-precision printing.

Modification Example 2

Figure 14:
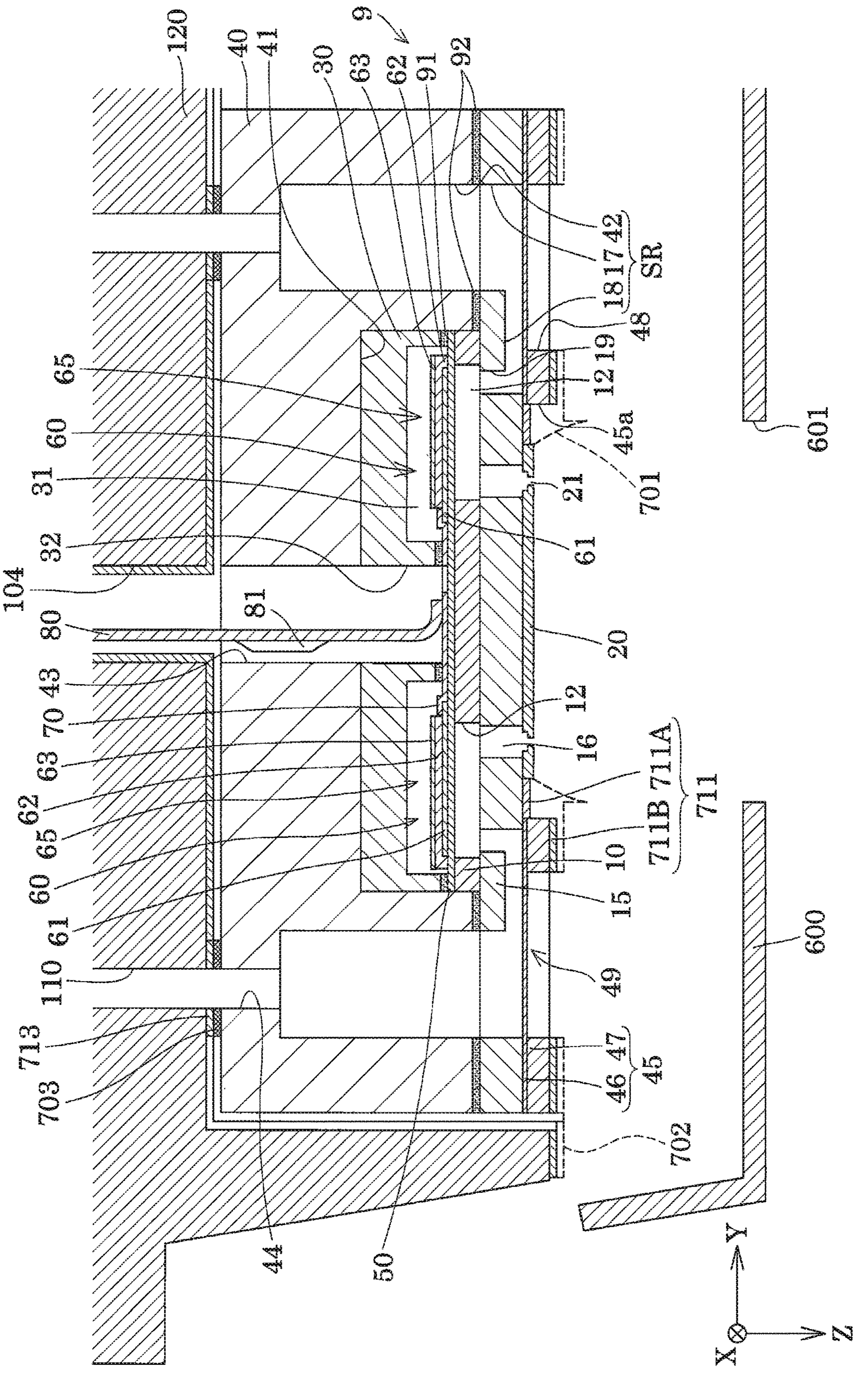
FIG. 14 is a cross-sectional view of a main part for describing Modification Example 2 of a method of manufacturing a liquid ejecting head.
Figure 15:
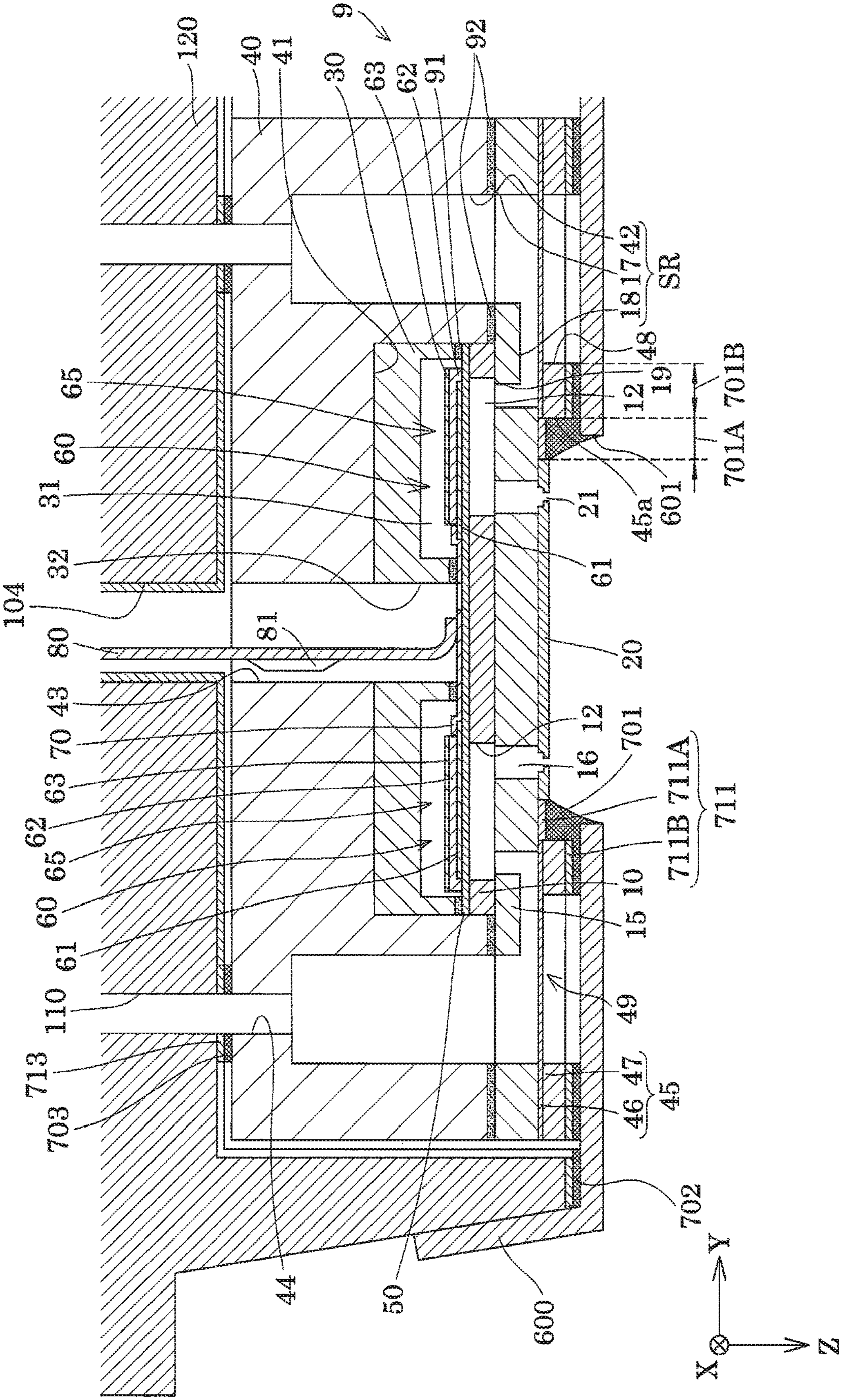
FIG. 15 is a cross-sectional view of a main part for describing Modification Example 2 of the method of manufacturing the liquid ejecting head.

FIGS. 14 and 15 are cross-sectional views of the main parts for describing Modification Example 2 of the method of manufacturing the liquid ejecting head 2 according to Embodiment 1. The same members as those in Embodiment 1 described above are designated by the same reference numerals, and redundant descriptions will be omitted. As illustrated in FIG. 14, a heating step is performed in which the first adhesive 701 and the second adhesive 702 are plasticized by causing the first heating element 711 and the second heating element 712 to generate heat to heat the first adhesive 701 and the second adhesive 702. In addition, the first adhesive 701 and the second adhesive 702 plasticized by the heating step are removed. Specifically, after releasing the bonding state between the holder 100 and the head chip 9 and the fixing plate 600, the plasticized first adhesive 701 and second adhesive 702 are removed. When the first adhesive 701 and the second adhesive 702 are removed in this manner, the plasticization of the first adhesive 701 and the second adhesive 702 is preferably softened. As a result, this is because the softened first adhesive 701 and second adhesive 702 are easily removed as lumps.

Next, as illustrated in FIG. 15, a bonding step of bonding the holder 100, the head chip 9, and the fixing plate 600 by applying the new first adhesive 701 and the second adhesive 702 is performed. The application of the new first adhesive 701 and the second adhesive 702 is performed in a state where the new first adhesive 701 and the second adhesive 702 are plasticized. The plasticization of the first adhesive 701 and the second adhesive 702 in an applying step may be performed by heating with the first heating element 711 and the second heating element 712, or may be performed by heating with a heating unit such as an external heater.

That is, in the present embodiment, the first adhesive 701 and the second adhesive 702 are replaced without replacing the head chip 9, the holder 100, and the fixing plate 600 of the liquid ejecting head 2.

As described above, when the thermoplastic adhesive is used as the first adhesive 701 and the second adhesive 702 and the first adhesive 701 and the second adhesive 702 are deteriorated, by heating and plasticizing the first adhesive 701 and the second adhesive 702, the first adhesive 701 and the second adhesive 702 can be replaced with new products. Therefore, it is possible to suppress poor adhesion between the head chip 9 and the holder 100 and the fixing plate 600, and the intrusion of ink from the first adhesive 701 and the second adhesive 702 into the inside. Therefore, the life of the liquid ejecting head 2 is not exhausted due to deterioration of the first adhesive 701 and the second adhesive 702, and the life of the liquid ejecting head 2 can be extended by replacing the first adhesive 701 and the second adhesive 702 with new products.

In the present embodiment, in the heating step, the first adhesive 701 and the second adhesive 702 are heated with the first heating element 711 and the second heating element 712, but the configuration is not particularly limited thereto. For example, by partially heating the entire liquid ejecting head 2 or a portion including the first adhesive 701 and the second adhesive 702 by a heating unit such as an external heater, the first adhesive 701 and the second adhesive 702 may be plasticized.

In Modification Example 2, although the first adhesive 701 and the second adhesive 702 are replaced with new products, the third adhesive 703 may be replaced with a new product by performing the same heating step and applying step.

Modification Example 3

Figure 16:
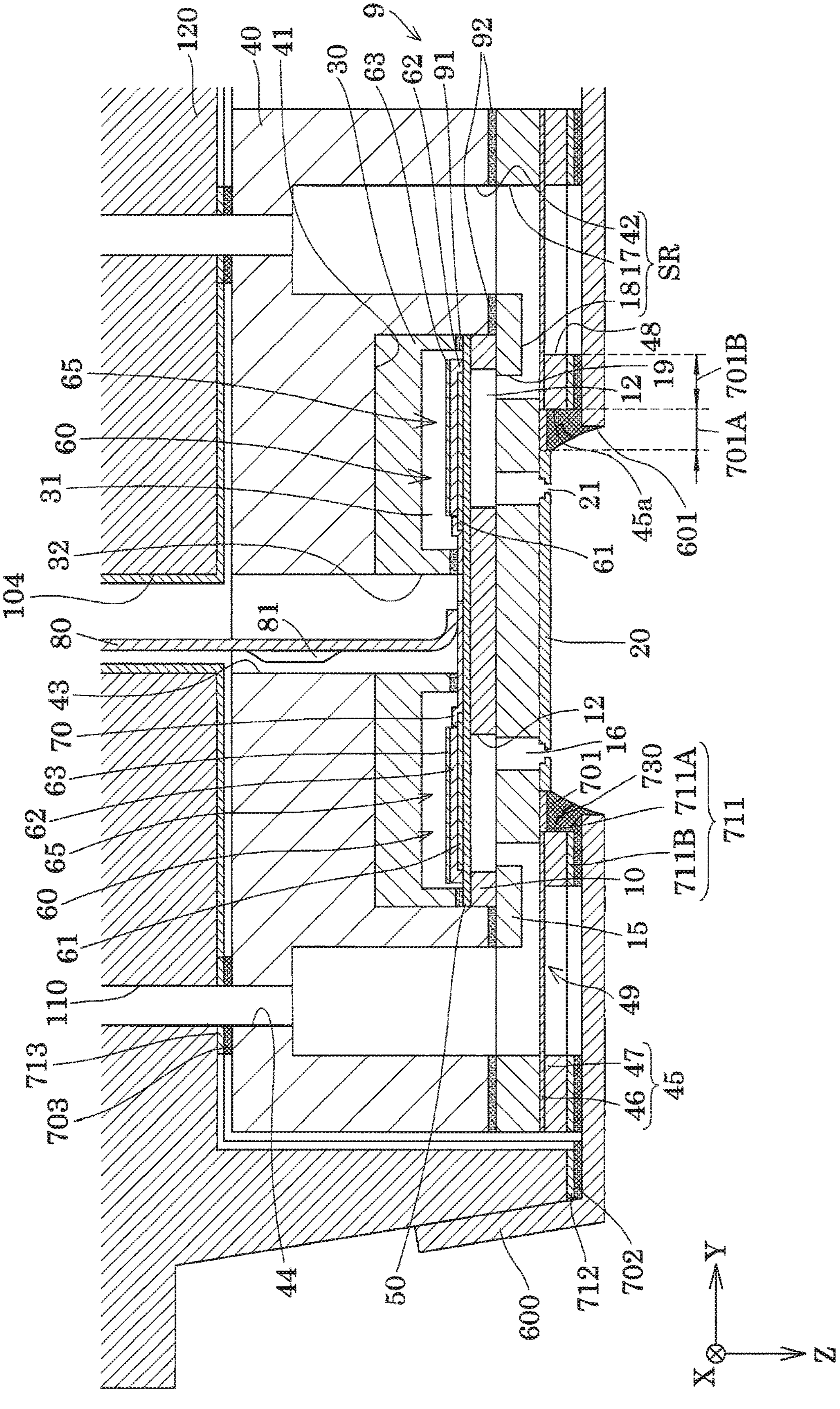
FIG. 16 is a cross-sectional view of a main part for describing Modification Example 3 of a method of manufacturing a liquid ejecting head.
Figure 17:
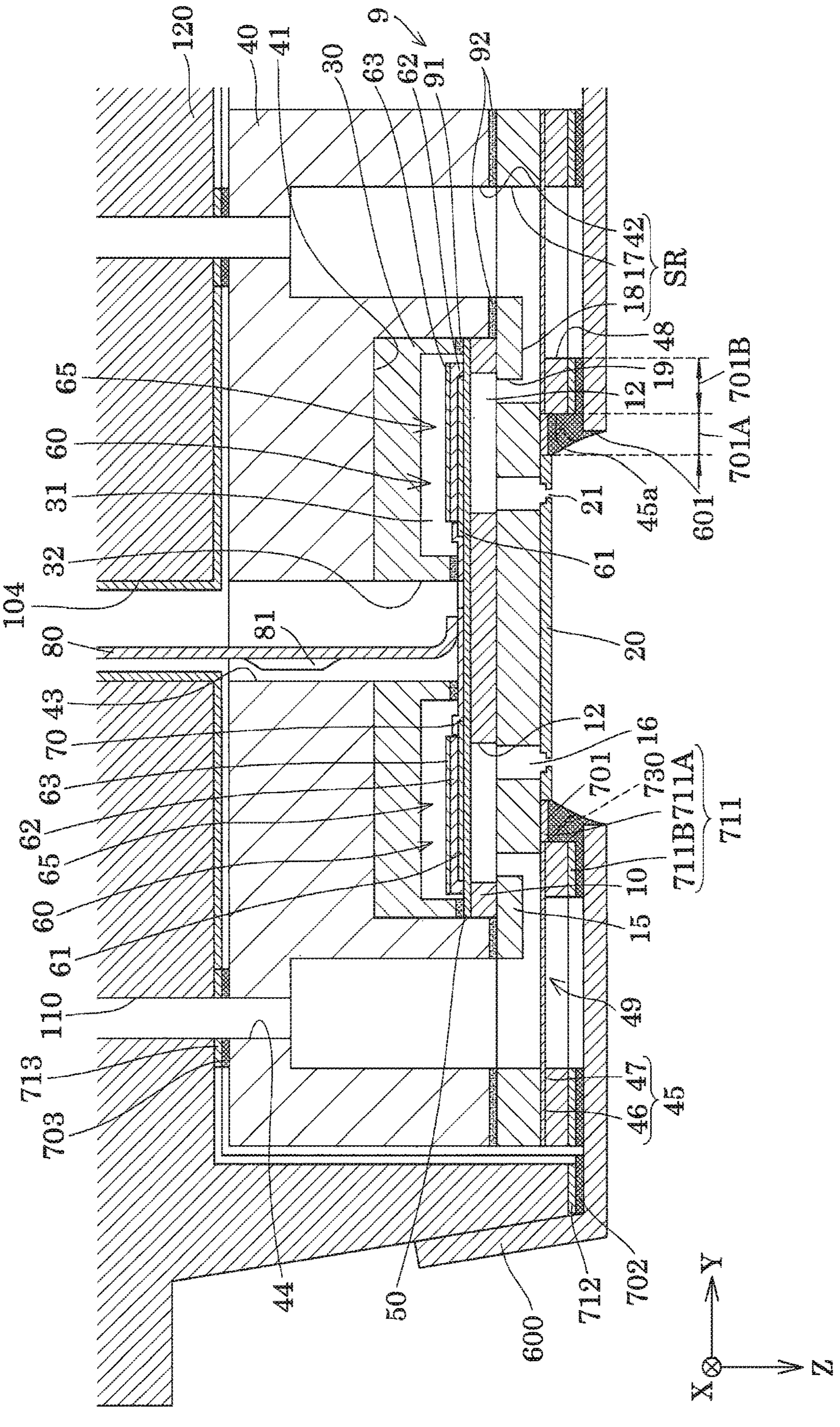
FIG. 17 is a cross-sectional view of a main part for describing Modification Example 3 of the method of manufacturing the liquid ejecting head.

FIGS. 16 and 17 are cross-sectional views of the main parts for describing Modification Example 3 of the method of manufacturing the liquid ejecting head 2 according to Embodiment 1. The same members as those in Embodiment 1 described above are designated by the same reference numerals, and redundant descriptions will be omitted.

As illustrated in FIG. 16, when a crack 730 occurs in the closing portion 701A of the first adhesive 701, as illustrated in FIG. 17, power is supplied to the first portion 711A of the first heating element 711 built into the liquid ejecting head 2 to generate heat, so that a heating step is performed to plasticize the closing portion 701A and close the cracks 730. The plasticization of the closing portion 701A in the heating step of closing the crack 730 of the closing portion 701A is preferably melted. By melting the closing portion 701A in this manner, the crack 730 is easily closed compared to the case of softening the closing portion 701A.

In the heating step, of the first adhesive 701, although the closing portion 701A exposed to the outside of the liquid ejecting head 2 is plasticized, the first adhesive 701 is heated to a temperature that does not plasticize the main fixing portion 701B not exposed to the outside of the liquid ejecting head 2. By heating the closing portion 701A so that the main fixing portion 701B that bonds the head chip 9 and the fixing plate 600 is not plasticized, the positional displacement between the fixing plate 600 and the head chip 9, and the like is unlikely to occur. In addition, for example, when the holder 100 and the fixing plate 600 are not bonded to each other, it is possible to prevent the head chip 9 and the fixing plate 600 from being released from the bonding state. That is, when it is not necessary to disassemble the fixing plate 600 and the head chip 9, only the closing portion 701A in which the crack 730 is generated can be plasticized and repaired.

By closing the crack 730 of the closing portion 701A exposed to the outside of the liquid ejecting head 2 in this manner, it is possible to suppress the intrusion of ink from the outside of the liquid ejecting head 2 into the inside through the crack 730.

In Modification Example 3, although the closing portion 701A is plasticized to close the crack 730, the configuration is not particularly limited thereto. For example, the main fixing portion 701B may be plasticized to close the crack formed in the main fixing portion 701B, the second adhesive 702 may be plasticized to close the crack formed in the second adhesive 702, and the third adhesive 703 may be plasticized to close the crack formed in the third adhesive 703.

In addition, in Modification Example 3, the closing portion 701A is melted to close the crack 730. However, as in Modification Example 2, after a removing step of removing the closing portion 701A by plasticizing the closing portion 701A with the crack 730 in a heating step is performed, by performing the bonding step of bonding the nozzle plate 20 and the fixing plate 600 by applying a new closing portion 701A, ink may be prevented from entering the inside of the liquid ejecting head 2 from the outside through the crack 730. In this case as well, in the heating step, of the first adhesive 701, although the closing portion 701A exposed to the outside of the liquid ejecting head 2 is plasticized, it is preferable that the first adhesive 701 is heated to a temperature that does not plasticize the main fixing portion 701B that is not exposed to the outside of the liquid ejecting head 2.

Modification Example 1 of Liquid Ejecting Head

Figure 18:
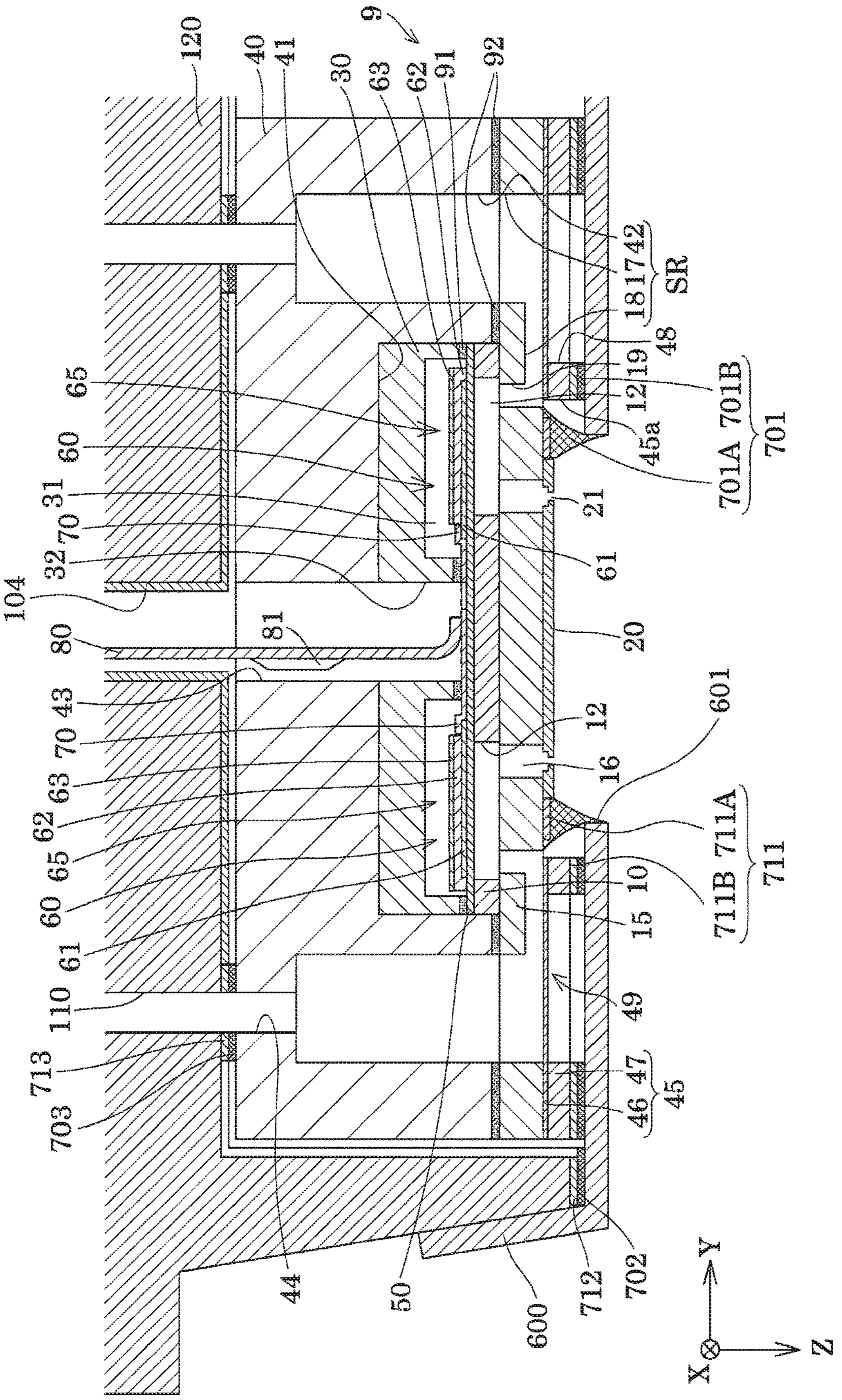
FIG. 18 is a cross-sectional view of a main part of Modification Example 1 of the liquid ejecting head.

FIG. 18 is a cross-sectional view illustrating a main part of Modification Example 1 of the liquid ejecting head 2 according to Embodiment 1 of the present disclosure.

As illustrated in FIG. 18, the closing portion 701A and the main fixing portion 701B of the first adhesive 701 are disposed with a gap from each other.

Even with such a configuration, the same effect as that of Embodiment 1 described above can be obtained. In addition, since the closing portion 701A and the main fixing portion 701B are disposed farther from each other, when the first portion 711A is caused to generate heat to plasticize the closing portion 701A, the main fixing portion 701B is unlikely to be heated and is unlikely to be plasticized. Therefore, when the closing portion 701A is plasticized, it is possible to suppress the release of the bonding state between the fixing plate 600 and the head chip 9, and suppress the positional displacement between the fixing plate 600 and the head chip 9.

Modification Example 2 of Liquid Ejecting Head

Figure 19:
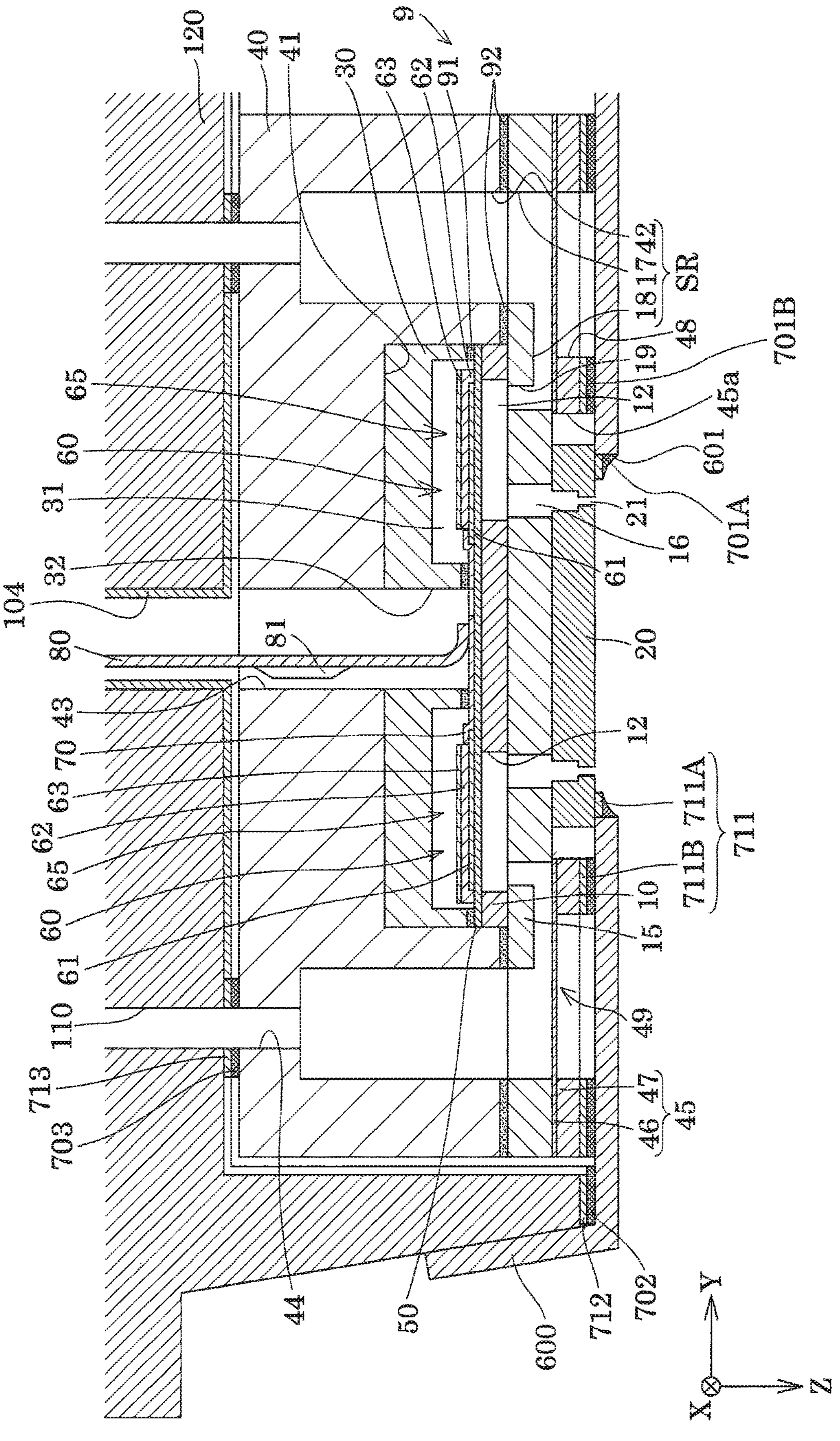
FIG. 19 is a cross-sectional view of a main part of Modification Example 2 of the liquid ejecting head.

FIG. 19 is a cross-sectional view illustrating a main part of Modification Example 2 of the liquid ejecting head 2 according to Embodiment 1. The same members as those in Embodiment 1 described above are designated by the same reference numerals, and redundant descriptions will be omitted.

As illustrated in FIG. 19, the opening portion 601 of the fixing plate 600 has an opening smaller than the outer periphery of the nozzle plate 20 when viewed in the Z-axis direction. The surface of the fixing plate 600 facing the −Z direction and the surface of the nozzle plate 20 facing the +Z direction may be bonded to each other, or may be abutted on each other without bonding.

In addition, the first adhesive 701 includes the closing portion 701A and the main fixing portion 701B. The main fixing portion 701B bonds the fixing plate 600 and the compliance substrate 45. The closing portion 701A is disposed between the inner peripheral surface of the opening portion 601 and the nozzle plate 20, and closes the space between the fixing plate 600 and the nozzle plate 20. That is, the closing portion 701A closes the corner portion between the inner peripheral surface of the opening portion 601 and the surface of the nozzle plate 20 exposed by the opening portion 601 and facing the +Z direction. The closing portion 701A may extend between the fixing plate 600 and the nozzle plate 20 to bond both. That is, the closing portion 701A and the main fixing portion 701B are formed as separate bodies having a gap formed therebetween.

The first heating element 711 includes the first portion 711A which heats and plasticizes the closing portion 701A, and the second portion 711B which heats and plasticizes the main fixing portion 701B. The first portion 711A is a surface of the nozzle plate 20 exposed by the opening portion 601 of the fixing plate 600 facing the +Z direction, and is disposed at a position overlapping the closing portion 701A when viewed in the Z-axis direction.

The second portion 711B is provided on the compliance substrate 45, similar to Embodiment 1 described above. That is, the first portion 711A and the second portion 711B are provided to be divided, and both are electrically independently provided. As a matter of course, the first portion 711A and the second portion 711B may be provided by dividing the first portion and the second portion, and electrically conducting the first portion and the second portion.

Even with such a configuration, the same effect as that of Embodiment 1 described above can be obtained. In addition, since the closing portion 701A and the main fixing portion 701B are disposed farther from each other, when the first portion 711A is caused to generate heat to plasticize the closing portion 701A, the main fixing portion 701B is unlikely to be heated and is unlikely to be plasticized. Therefore, it is possible to suppress the release of the bonding state between the fixing plate 600 and the head chip 9 when the closing portion 701A is plasticized, and it is possible to suppress the positional displacement between the fixing plate 600 and the head chip 9.

Other Modification Examples

One embodiment of the present disclosure has been described above, but the basic configuration of the present disclosure is not limited to the above.

For example, in the above-described embodiments and modification examples, the configuration in which the head chip 9 and the holder 100 are bonded to each other by the third adhesive 703 is illustrated, but the configuration is not particularly limited thereto. The head chip 9 and the holder 100 may be fixed without using an adhesive, for example, by a screw, a spring, or the like. When the head chip 9 and the holder 100 are fixed by screws, springs, or the like in this manner, the first adhesive 701 and the second adhesive 702 are plasticized with the first heating element 711 and the second heating element 712, and the fixing plate 600 is removed from the head chip 9 and the holder 100, so that the head chip 9 can be replaced with a new product.

Figure 20:
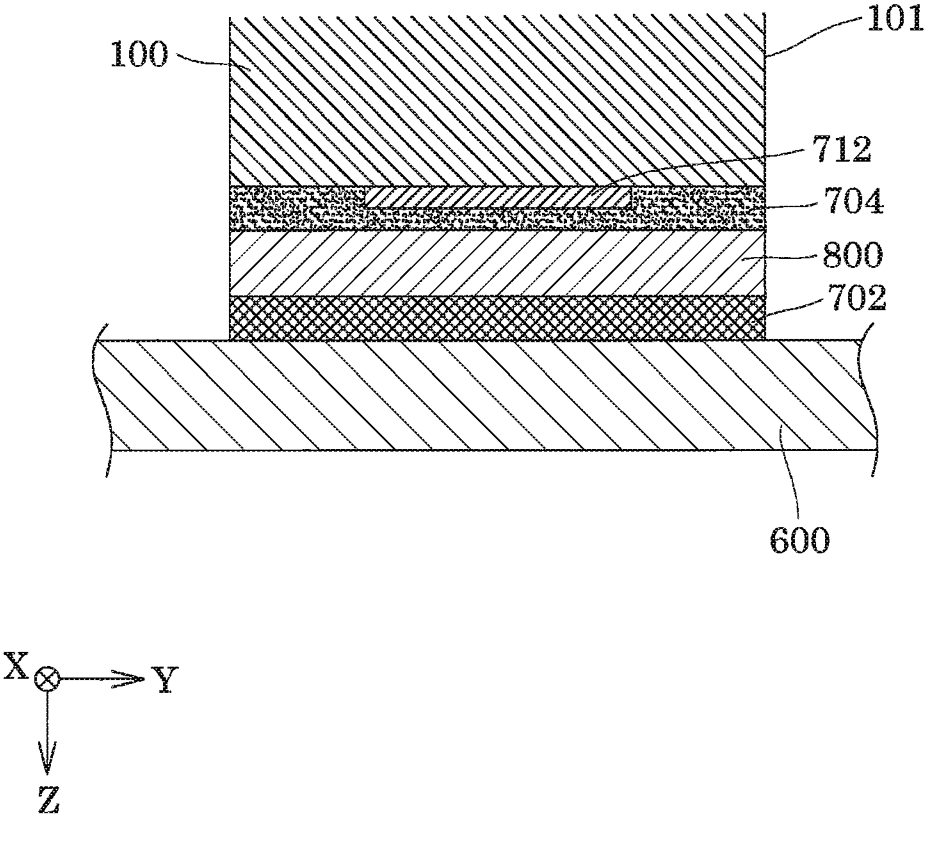
FIG. 20 is a cross-sectional view of a main part of another modification example of a liquid ejecting head.

In addition, in the above-described embodiments and each modification example, the configuration in which the heating element comes into direct contact with the adhesive is illustrated, but the configuration is not particularly limited thereto. FIG. 20 is a cross-sectional view of a main part for describing a modification example of the second heating element 712 and the second adhesive 702. As illustrated in FIG. 20, the second heating element 712 is formed on a surface of the holder 100 facing the +Z direction where the holding portion 101 is open. A heat transfer member 800 is provided between the second heating element 712 and the second adhesive 702.

The heat transfer member 800 is made of a material having a higher thermal conductivity than that of the members bonded by the second adhesive 702, that is, the holder 100 and the fixing plate 600. As the material having high thermal conductivity, metals such as aluminum and copper, ceramics such as aluminum nitride and silicon carbide, and the like are suitable.

By providing the heat transfer member 800 in this manner, the heat of the second heating element 712 can be transferred to the second adhesive 702 with reduced variation over a wide range. Therefore, the second adhesive 702 can be uniformly plasticized with the second heating element 712.

The heat transfer member 800 is preferably fixed to the holder 100 to which the second heating element 712 is fixed by the thermosetting adhesive 704. As a result, it is possible to prevent the fixing between the holder 100 and the heat transfer member 800 from being released.

In addition, in the above-described example, the heat transfer member 800 is provided in a region where the second adhesive 702 is provided, but the configuration is not particularly limited thereto. The heat transfer member 800 may be provided in a region where the first adhesive 701 is provided or a region where the third adhesive 703 is provided.

When the heat transfer member 800 is provided in the region where the first adhesive 701 is provided, the heat transfer member 800 may be made of a material having a higher thermal conductivity than that of the members bonded by the first adhesive 701, that is, the flow path forming substrate 15, the nozzle plate 20, the compliance substrate 45, and the fixing plate 600. In addition, when the heat transfer member 800 is provided in the region where the third adhesive 703 is provided, the heat transfer member 800 may be made of a material having a higher thermal conductivity than that of the members bonded by the third adhesive 703, that is, the holder 100 and the case member 40.

In addition, in the above-described embodiments and each modification example, a heating element is provided inside the liquid ejecting head 2, and the adhesive is heated and plasticized with the heating element provided inside, but the configuration is not particularly limited thereto. The adhesive may be plasticized by heating from the outside of the liquid ejecting head 2 with a heating unit such as a heater. However, when the heating element is provided inside the liquid ejecting head 2 as in each of the above-described embodiments, the adhesive can be efficiently heated. In addition, by providing the heating element inside the liquid ejecting head 2, heating of the head chip 9, the holder 100, and the fixing plate 600, which do not require to be heated, can be suppressed, and problems caused by heating can be suppressed, as compared with the case of heating the entire liquid ejecting head 2 from the outside.

In addition, in the above-described embodiment and each modification example, the relay substrate 400 is provided with the on-substrate wiring 420 that couples the heating element to the outside, but the configuration is not particularly limited thereto. The heating element may be electrically coupled to the outside without passing through the relay substrate 400. In addition, the positions at which the input wiring 721A for the first portion, the output wiring 721B for the first portion, the input wiring 721C for the second portion, the output wiring 721D for the second portion, the input wiring 722A for the second heating element, and the output wiring 722B for the second heating element, the input wiring 723B for the third heating element, and the output wiring 723C for the third heating element are formed are not limited to the positions described above.

In addition, in Embodiment 1 described above, the head chip 9 and the fixing plate 600 are fixed by bonding the fixed substrate 47, the flow path forming substrate 15, the nozzle plate 20, and the fixing plate 600 by the first adhesive 701, but the configuration is not particularly limited thereto. The head chip 9 and the fixing plate 600 may be fixed only by bonding the flow path forming substrate 15 and the fixing plate 600 by the first adhesive 701, or the head chip 9 and the fixing plate 600 may be fixed only by bonding the nozzle plate 20 and the fixing plate 600.

Figure 21:
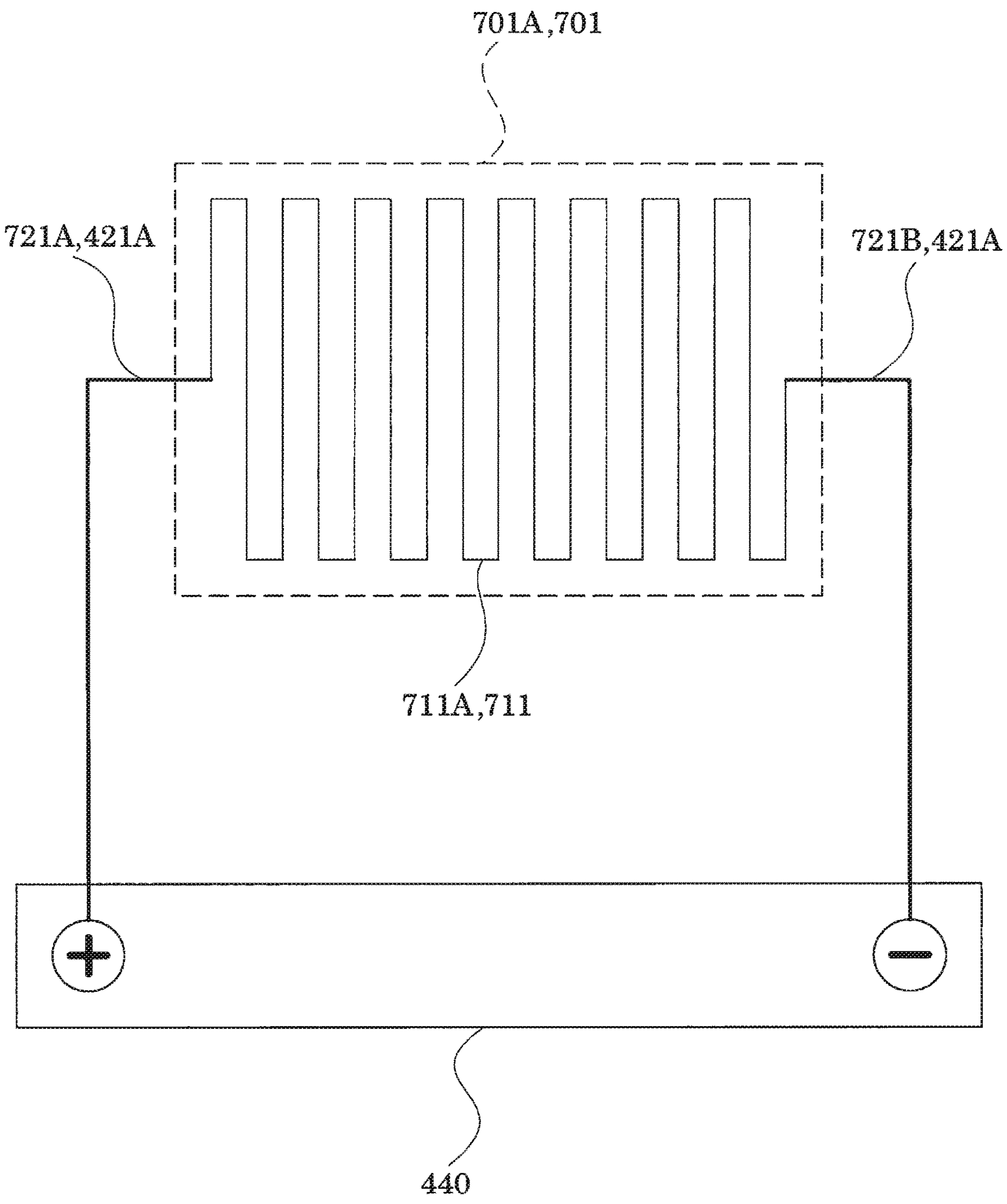
FIG. 21 is a plan view of another modification example of a heating element.

In addition, when a heating wire is used as the heating element, it is preferable to make the heating element meander in order to increase the wiring density per unit area of the heating element. Specifically, as illustrated in FIG. 21, in the region where the closing portion 701A of the first adhesive 701 is provided, the first portion 711A of the first heating element 711 is provided in a meandering manner. The fact that the first portion 711A is provided in a meandering manner means that the first portion 711A is not provided linearly between an end portion coupled to the input wiring 721A for the first portion and an end portion coupled to the output wiring 721B for the first portion, but is provided in a winding manner. In the example illustrated in FIG. 21, the first portion 711A is provided so as to reciprocate in a direction intersecting the direction of the line connecting the end portion coupled to the input wiring 721A for the first portion and the end portion coupled to the output wiring 721B for the first portion. By providing the first portion 711A in a meandering manner in the region where the closing portion 701A is provided, the wiring density per unit area of the first portion 711A can be increased, and the amount of heat generated can be increased. Such meandering of the heating element is not limited to the first portion 711A with respect to the closing portion 701A, and is preferably applied to the second portion 711B with respect to the main fixing portion 701B, the second heating element 712 with respect to the second adhesive 702, and the third heating element 713 with respect to the third adhesive 703.

In addition, in Embodiment 1 described above, the thin film type piezoelectric actuator 60 is described as a pressure generating unit for causing the pressure change in the pressure chamber 12, but the configuration is not particularly limited thereto. For example, a thick film type piezoelectric actuator formed by a method such as attaching a green sheet, or a longitudinal vibration type piezoelectric actuator that expands and contracts in the axial direction by alternately laminating piezoelectric materials and electrode forming materials, or the like can be used. In addition, as a pressure generating unit, a unit in which a heat generating element is disposed in the pressure chamber 12 to eject the droplets from the nozzle 21 by bubbles generated due to the heat of the heat generating element, or a so-called electrostatic actuator that generates static electricity between a diaphragm and an electrode, deforms the diaphragm by the electrostatic force, and ejects the droplets from the nozzle 21 can be used.

Furthermore, the present disclosure is broadly applicable to liquid ejecting heads in general, and examples thereof include recording heads, such as various types of ink jet type recording heads used in image recording apparatus, such as printers, a color material ejecting head used for manufacturing a color filter, such as a liquid crystal display, an electrode material ejecting head used for forming electrodes, such as an organic EL display or a field emission display (FED), and a bioorganic material ejecting head used for manufacturing a bio chip.

In addition, although the ink jet type recording apparatus has been described as an example of the liquid ejecting apparatus, the present disclosure can also be used for a liquid ejecting apparatus using the other liquid ejecting head described above.

APPENDIX

From the embodiments exemplified above, for example, the following configuration can be grasped.

A liquid ejecting head according to Aspect 1, which is a preferred aspect, includes a head chip that includes a nozzle plate having a plurality of nozzles ejecting a liquid, another member different from the head chip, an adhesive that bonds the head chip and the other member, and a heating element that plasticizes the adhesive. As a result, by plasticizing the adhesive with the heating element, cracks or the like generated in the adhesive can be closed and repaired, or the adhesive can be removed and reapplied. In addition, by plasticizing the adhesive with the heating element, the bonding state between the head chip and the other member can be released, and the head chip or the other member can be replaced with a new product. Therefore, the liquid ejecting head can be regenerated.

In Aspect 2, which is a specific example of Aspect 1, the other member includes a fixing plate that has an opening portion exposing the nozzle plate to an outside, the adhesive includes a first adhesive that bonds the head chip to the fixing plate, and the heating element includes a first heating element that plasticizes the first adhesive. With this configuration, the first adhesive that bonds the fixing plate and the head chip is heated and plasticized with the first heating element, so that the first adhesive can be repaired. In addition, by plasticizing the first adhesive with the first heating element, the bonding state between the fixing plate and the head chip can be released, and the fixing plate or the head chip can be replaced.

In Aspect 3, which is a specific example of Aspect 2, the liquid ejecting head further includes a holder that holds the head chip, a second adhesive that bonds the fixing plate and the holder, and a second heating element that plasticizes the second adhesive. With this configuration, the second adhesive that bonds the fixing plate and the holder is heated and plasticized with the second heating element, so that the second adhesive can be repaired. In addition, by plasticizing the second adhesive with the second heating element, the bonding state between the fixing plate and the holder can be released, and the fixing plate or the holder can be replaced. In addition, in a configuration in which the head chip and the holder are not directly bonded to each other, the head chip can be replaced by releasing the bonding state between the fixing plate and the holder.

In Aspect 4, which is a specific example of Aspect 3, the other member includes the holder, the adhesive includes a third adhesive that bonds the head chip and the holder, and the heating element includes a third heating element that plasticizes the third adhesive. With this configuration, the third adhesive that bonds the holder and the head chip is heated and plasticized with the third heating element, so that the third adhesive can be repaired. In addition, by plasticizing the third adhesive with the third heating element, the bonding state between the holder and the head chip can be released, and the holder or the head chip can be replaced.

In Aspect 5, which is a specific example of Aspect 1, the other member includes a holder that holds the head chip, the adhesive includes a third adhesive that bonds the head chip and the holder, and the heating element includes a third heating element that plasticizes the third adhesive. With this configuration, the third adhesive that bonds the holder and the head chip is heated and plasticized with the third heating element, so that the third adhesive can be repaired. In addition, by plasticizing the third adhesive with the third heating element, the bonding state between the holder and the head chip can be released, and the holder or the head chip can be replaced.

In Aspect 6, which is a specific example of Aspect 2, the first heating element is fixed to the head chip. With this configuration, since the fixing plate is replaced more frequently than the head chip, the first heating element is fixed to the head chip, so that it is possible to suppress the replacement of the first heating element when replacing the fixing plate, and the cost can be reduced.

In Aspect 7, which is a specific example of Aspect 2, the first adhesive includes a closing portion that is disposed between an inner peripheral surface of the opening portion and the nozzle plate and that closes between the fixing plate and the nozzle plate. Even when a crack occurs in the closing portion formed so that the liquid does not enter the inside of the liquid ejecting head from a space between the fixing plate and the nozzle plate, the crack can be closed and repaired by plasticizing the closing portion, or the closing portion can be removed and reapplied to regenerate the liquid ejecting head.

In Aspect 8, which is a specific example of Aspect 7, the first adhesive includes a main fixing portion different from the closing portion and disposed farther from the opening portion than the closing portion, the first heating element includes a first portion that plasticizes the closing portion and a second portion that plasticizes the main fixing portion, and the first portion and the second portion are electrically independent. When the closing portion is plasticized, it is possible to suppress the release of the adhesion between the head chip and the fixing plate.

A liquid ejecting head according to Aspect 9, which is a preferred aspect, includes a plurality of head chips that includes a nozzle plate having a plurality of nozzles ejecting a liquid, a fixing plate to which the plurality of head chips are fixed, and that includes a plurality of opening portions exposing the plurality of nozzle plates to an outside, a holder that holds the plurality of head chips, an adhesive that bonds the fixing plate and the holder, and a heating element that plasticizes the adhesive. With this configuration, by plasticizing the adhesive that bonds the holder and the fixing plate with the heating element, cracks generated in the adhesive can be repaired, or the adhesive can be removed and reapplied. In addition, by plasticizing the adhesive with the heating element, it is possible to release the bonding state between the holder and the fixing plate and replace the holder or a unit in which a plurality of head chips and the fixing plate are fixed with a new product. Therefore, the liquid ejecting head can be regenerated.

In Aspect 10, which is a specific example of Aspect 9, the heating element is fixed to the holder. With this configuration, since the fixing plate is replaced more frequently than the holder, the heating element is fixed to the holder, so that it is possible to suppress the replacement of the heating element when replacing the fixing plate, and the cost can be reduced.

In Aspect 11, which is a specific example of Aspect 1, the heating element is in contact with the adhesive. With this configuration, the heat of the heating element can be efficiently transferred to the adhesive.

In Aspect 12, which is a specific example of Aspect 1, the liquid ejecting head further includes a heat transfer member disposed between the heating element and the adhesive, and having a higher thermal conductivity than a thermal conductivity of the other member and a member to which the adhesive of the head chip is applied. With this configuration, the heat of the heating element can be transferred while suppressing the variation in a wide range through the heat transfer member.

In Aspect 13, which is a specific example of Aspect 1, the liquid ejecting head further includes a printing path which is an electrical path contributing to a recording operation of ejecting a liquid onto a medium, and a heating path which is an electrical path including the heating element, in which the heating path and the printing path are electrically independent. With this configuration, it is possible to suppress the supply of electricity to the heating element while supplying electricity to the printing path, and to suppress the plasticization of the adhesive during the recording operation.

In Aspect 14, which is a specific example of Aspect 13, the liquid ejecting head further includes a connector that includes a terminal of the printing path and a terminal of the heating path. With this configuration, the number of components can be reduced and the cost can be reduced.

In Aspect 15, which is a specific example of Aspect 1, the heating element includes a heating wire.

In Aspect 16 which is a specific example of Aspect 15, the liquid ejecting head further includes a heating path which is an electrical path including the heating wire and a relay wiring coupling an external electrode of the liquid ejecting head and the heating wire, in which an electric resistance coefficient of the relay wiring is lower than an electric resistance coefficient of the heating wire. With this configuration, it is possible to reduce the power consumption in the relay wiring and efficiently generate heat from the heating element.

In Aspect 17, which is a specific example of Aspect 1, the adhesive has an insulating property. It is possible to suppress the flow of current to the nozzle plate or another member via the adhesive. Therefore, peeling and deterioration of the liquid repellent film formed on the nozzle plate or another member can be suppressed.

In Aspect 18 which is a specific example of Aspect 1, at least some members of a plurality of members constituting the head chip are bonded to each other by a thermosetting adhesive. With this configuration, when the heating element generates heat, the thermosetting adhesive that bonds the member of the head chip is plasticized, and leakage of liquid, positional displacement and disassembly of the member, and the like can be suppressed. In addition, liquid resistance can be improved by using the thermosetting adhesive.

In Aspect 19, which is a specific example of Aspect 1, a softening point of the adhesive is lower than a boiling point of the liquid. With this configuration, when the heating element caused to generate heat to soften the adhesive, it is possible to prevent the liquid remaining in the liquid ejecting head from being a foreign matter.

In the Aspect 20 which is a specific example of Aspect 1, at least one of a member of the head chip to which the adhesive is applied and the other member to which the adhesive is applied is a thermoplastic resin, and a melting point of the thermoplastic resin is higher than a softening point of the adhesive. With this configuration, when the heating element is caused to generate heat to soften the adhesive, it is possible to prevent the member made of the thermoplastic resin from being damaged by the heat of the heating element.

A liquid ejecting apparatus according to Aspect 21, which is a preferred aspect, includes the liquid ejecting head according to Aspect 1, in which the heating element is not energized. With this configuration, during the liquid ejecting apparatus is used, the heating element is not energized, so that the plasticization of the adhesive can be suppressed.

In the liquid ejecting head according to Aspect 22, which is a preferred aspect, the head chip and the other member are laminated in a lamination direction, and the heating element and the adhesive are disposed between the head chip and the other member in the lamination direction. With this configuration, the adhesive between the laminated components can be heated with the heating element to be plasticized, so that the laminated components can be easily disassembled.

In the liquid ejecting head according to Aspect 23, which is a specific example of Aspect 22, the heating element and the adhesive overlap when viewed in the lamination direction. With this configuration, the adhesive between the laminated components can be heated with the heating element to be plasticized, so that the laminated components can be easily disassembled.

What is claimed is:

1. A liquid ejecting head comprising:

a head chip that includes a nozzle plate having nozzles configured to eject a liquid;

another member different from the head chip;

an adhesive that bonds the head chip and the other member; and a heating element configured to plasticize the adhesive.

2. The liquid ejecting head according to claim 1, wherein the other member includes a fixing plate that has an opening portion exposing the nozzle plate to an outside, the adhesive includes a first adhesive that bonds the head chip to the fixing plate, and the heating element includes a first heating element configured to plasticize the first adhesive.

3. The liquid ejecting head according to claim 2, further comprising:

a holder that holds the head chip;

a second adhesive that bonds the fixing plate and the holder; and a second heating element configured to plasticize the second adhesive.

4. The liquid ejecting head according to claim 3, wherein the other member includes the holder, the adhesive includes a third adhesive that bonds the head chip and the holder, and the heating element includes a third heating element configured to plasticize the third adhesive.

5. The liquid ejecting head according to claim 1, wherein the other member includes a holder that holds the head chip, the adhesive includes a third adhesive that bonds the head chip and the holder, and the heating element includes a third heating element configured to plasticize the third adhesive.

6. The liquid ejecting head according to claim 2, wherein the first heating element is fixed to the head chip.

7. The liquid ejecting head according to claim 2, wherein the first adhesive includes a closing portion that is disposed between an inner peripheral surface of the opening portion and the nozzle plate and that closes between the fixing plate and the nozzle plate.

8. The liquid ejecting head according to claim 7, wherein the first adhesive includes a main fixing portion different from the closing portion and disposed farther from the opening portion than the closing portion, the first heating element includes a first portion configured to plasticize the closing portion and a second portion configured to plasticize the main fixing portion, and the first portion and the second portion are electrically independent.

9. A liquid ejecting head comprising:

head chips that respectively includes a nozzle plate having nozzles configured to eject a liquid;

a fixing plate to which the head chips are fixed, and that includes opening portions respectively exposing the nozzle plates to an outside;

a holder that holds the head chips;

an adhesive that bonds the fixing plate and the holder; and a heating element configured to plasticize the adhesive.

10. The liquid ejecting head according to claim 9, wherein the heating element is fixed to the holder.

11. The liquid ejecting head according to claim 1, wherein the heating element is in contact with the adhesive.

12. The liquid ejecting head according to claim 1, further comprising:

a heat transfer member disposed between the heating element and the adhesive, and having a higher thermal conductivity than a thermal conductivity of the other member and a member to which the adhesive of the head chip is applied.

13. The liquid ejecting head according to claim 1, further comprising:

a printing path which is an electrical path contributing to a recording operation of ejecting a liquid onto a medium; and a heating path which is an electrical path including the heating element, wherein the heating path and the printing path are electrically independent.

14. The liquid ejecting head according to claim 13, further comprising:

a connector that includes a terminal of the printing path and a terminal of the heating path.

15. The liquid ejecting head according to claim 1, wherein the heating element includes a heating wire.

16. The liquid ejecting head according to claim 15, further comprising:

a heating path which is an electrical path including the heating wire and a relay wiring coupling an external electrode of the liquid ejecting head and the heating wire, wherein an electric resistance coefficient of the relay wiring is lower than an electric resistance coefficient of the heating wire.

17. The liquid ejecting head according to claim 1, wherein at least one of a member of the head chip to which the adhesive is applied and the other member to which the adhesive is applied is a thermoplastic resin, and a melting point of the thermoplastic resin is higher than a softening point of the adhesive.

18. A liquid ejecting apparatus comprising:

the liquid ejecting head according to claim 1, wherein the heating element is not energized.

19. The liquid ejecting head according to claim 1, wherein the head chip and the other member are laminated in a lamination direction, and the heating element and the adhesive are disposed between the head chip and the other member in the lamination direction.

20. The liquid ejecting head according to claim 19, wherein the heating element and the adhesive overlap when viewed in the lamination direction.

* * * * *